(12) United States Patent
Ishizaka

(10) Patent No.: US 7,593,129 B2
(45) Date of Patent: Sep. 22, 2009

(54) RECORDING APPARATUS, DATA PROCESSING METHOD FOR RECORDING APPARATUS, AND RECORDING SYSTEM

(75) Inventor: Nobuhiro Ishizaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 781 days.

(21) Appl. No.: 11/368,701

(22) Filed: Mar. 7, 2006

(65) Prior Publication Data

US 2006/0203074 A1 Sep. 14, 2006

(30) Foreign Application Priority Data

Mar. 8, 2005 (JP) ............................. 2005-064558

(51) Int. Cl.
*G06F 15/00* (2006.01)
*B41J 29/393* (2006.01)

(52) U.S. Cl. ........................................ 358/1.18; 347/19
(58) Field of Classification Search ................ 358/1.18, 358/1.16, 1.8, 1.4, 1.15; 347/7, 9, 14, 15, 347/19, 37, 40, 41, 49, 47, 54, 67, 85; 400/61, 400/62, 120.01, 124.11
See application file for complete search history.

(56) References Cited

U.S. PATENT DOCUMENTS

| 6,648,439 | B2 | 11/2003 | Oikawa |
| 6,913,337 | B2 | 7/2005 | Kuronuma et al. |
| 6,918,646 | B2 | 7/2005 | Kanda et al. |
| 2003/0193536 | A1 | 10/2003 | Kuronuma et al. |
| 2003/0193675 | A1 | 10/2003 | Moriyama et al. |
| 2003/0193691 | A1 | 10/2003 | Tanaka et al. |
| 2007/0139665 | A1* | 6/2007 | Ishizaka et al. ............... 358/1.4 |

FOREIGN PATENT DOCUMENTS

| JP | 2003-305895 | 10/2003 |
| JP | 2003-305896 | 10/2003 |
| KR | 2002-90323 | 12/2002 |
| KR | 2003-82403 | 10/2003 |
| KR | 2003-82404 | 10/2003 |

* cited by examiner

*Primary Examiner*—Saeid Ebrahimi Dehkordy
(74) *Attorney, Agent, or Firm*—Fitzpatrick, Cella, Harper & Scinto

(57) ABSTRACT

To accelerate processing that generates recording data at a host computer, a host device sends, as setting data, data including a first registration adjustment value corresponding to a relative distance in a scanning direction between respective nozzle arrays and a second registration adjustment value corresponding to an inclination of each recording element array in a direction intersecting with a scanning direction, a recording apparatus includes a recording buffer 4 that stores recording data of each nozzle array in association with a recording position in a scanning direction, and a record buffering structure control circuit 8 performs control to adjust storage positions of recording data of each nozzle array based on the two registration adjustment values stored in a register and store the data in the recording buffer 4.

16 Claims, 23 Drawing Sheets

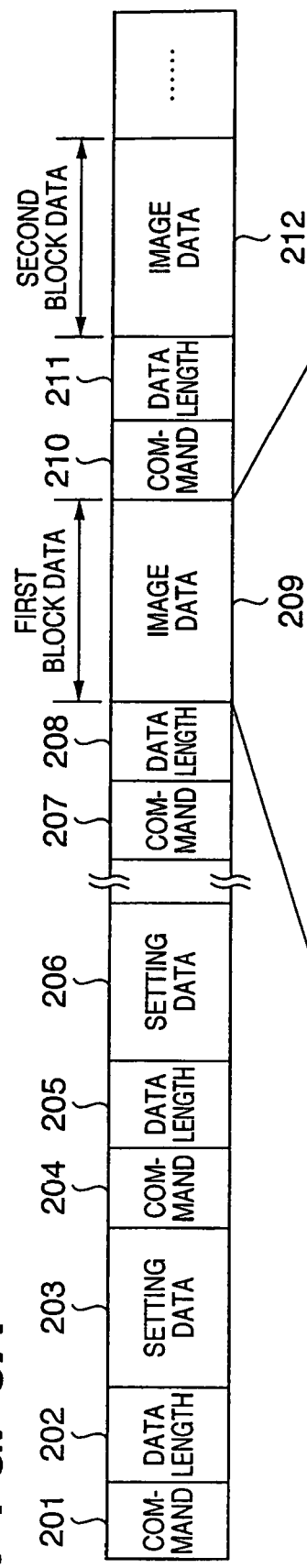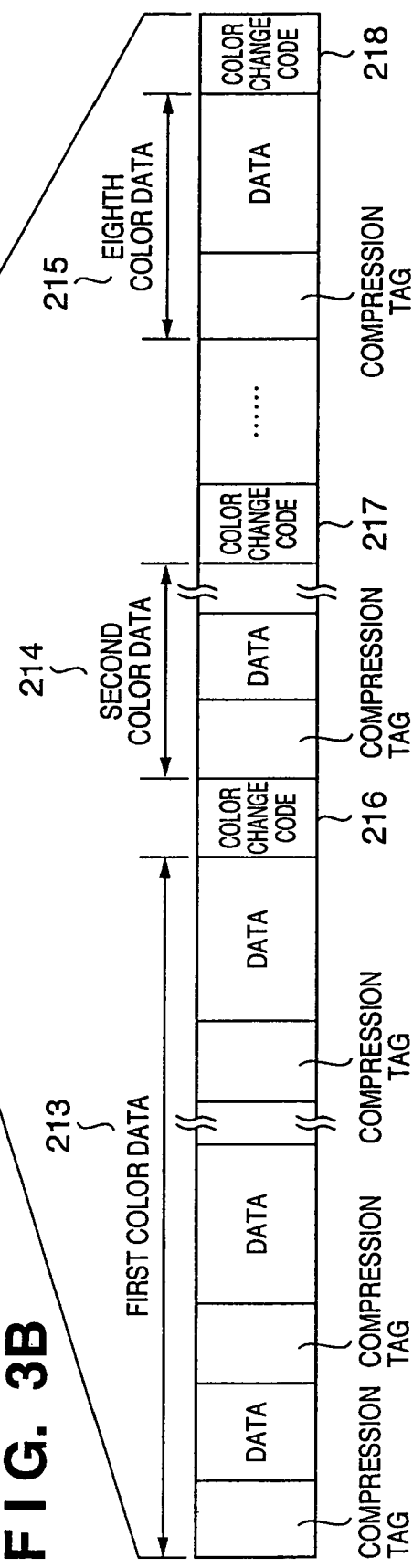

FIG. 3C
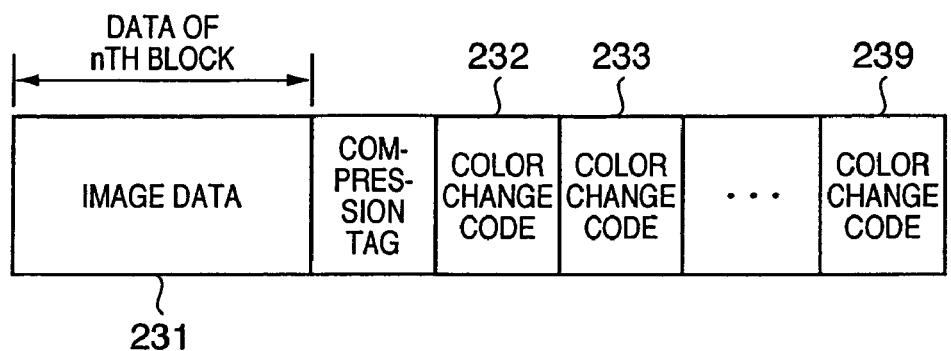
FIG. 3D
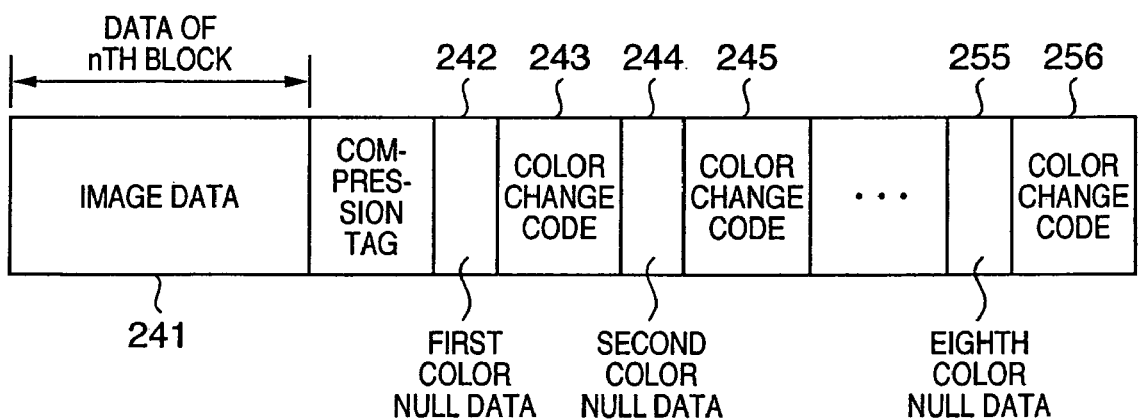
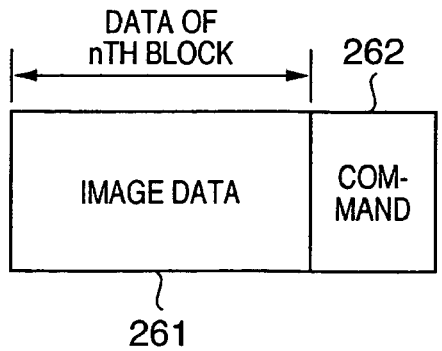
FIG. 3E

F I G. 4

| 1ST BLOCK | 2ND BLOCK | 3RD BLOCK | 4TH BLOCK | 5TH BLOCK | 6TH BLOCK | 7TH BLOCK | 8TH BLOCK |
|---|---|---|---|---|---|---|---|
| 1ST COLOR DATA | 1ST COLOR DATA | 1ST COLOR DATA | 1ST COLOR DATA | 1ST COLOR DATA | 1ST COLOR DATA | 1ST COLOR DATA | 1ST COLOR DATA |
| 2ND COLOR DATA | 2ND COLOR DATA | 2ND COLOR DATA | 2ND COLOR DATA | 2ND COLOR DATA | 2ND COLOR DATA | 2ND COLOR DATA | 2ND COLOR DATA |
| 3RD COLOR DATA | 3RD COLOR DATA | 3RD COLOR DATA | 3RD COLOR DATA | 3RD COLOR DATA | 3RD COLOR DATA | 3RD COLOR DATA | 3RD COLOR DATA |
| 4TH COLOR DATA | 4TH COLOR DATA | 4TH COLOR DATA | 4TH COLOR DATA | 4TH COLOR DATA | 4TH COLOR DATA | 4TH COLOR DATA | 4TH COLOR DATA |
| 5TH COLOR DATA | 5TH COLOR DATA | 5TH COLOR DATA | 5TH COLOR DATA | 5TH COLOR DATA | 5TH COLOR DATA | 5TH COLOR DATA | 5TH COLOR DATA |
| 6TH COLOR DATA | 6TH COLOR DATA | 6TH COLOR DATA | 6TH COLOR DATA | 6TH COLOR DATA | 6TH COLOR DATA | 6TH COLOR DATA | 6TH COLOR DATA |
| 7TH COLOR DATA | 7TH COLOR DATA | 7TH COLOR DATA | 7TH COLOR DATA | 7TH COLOR DATA | 7TH COLOR DATA | 7TH COLOR DATA | 7TH COLOR DATA |
| 8TH COLOR DATA | 8TH COLOR DATA | 8TH COLOR DATA | 8TH COLOR DATA | 8TH COLOR DATA | 8TH COLOR DATA | 8TH COLOR DATA | 8TH COLOR DATA |

FIG. 10

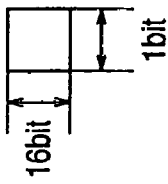

ADDRESS UPDATING METHOD AT TIME OF REGISTRATION ADJUSTMENT
(ACTUAL ADDRESSES THAT STORE DATA)
(1ST COLOR: [HEIGHT: 3, WIDTH: 16], REGISTRATION WIDTH = 6, INCLINATION CORRECTION OF 1ST ROW = 0,
INCLINATION CORRECTION OF 2ND ROW = 1, INCLINATION CORRECTION OF 3RD ROW = 2)
(2ND COLOR: [HEIGHT: 3, WIDTH: 16], REGISTRATION WIDTH = 2, INCLINATION CORRECTION OF 1ST ROW = 0,
INCLINATION CORRECTION OF 2ND ROW = 0, INCLINATION CORRECTION OF 3RD ROW = 1)

| | | | | | | | | | | | | | | | | | | | |
|---|---|---|---|---|---|---|---|---|---|---|---|---|---|---|---|---|---|---|---|
| 1:1ST COLOR | 0 | 6 | C | 12 | 18 | 1E | 24 | 2A | 30 | 36 | 3C | 42 | 48 | 4E | 54 | 5A | | | |
| | 2 | 8 | E | 14 | 1A | 20 | 26 | 2C | 32 | 38 | 3E | 44 | 4A | 50 | 56 | 5C | | | |
| | 4 | A | 10 | 16 | 1C | 22 | 28 | 2E | 34 | 3A | 40 | 46 | 4C | 52 | 58 | 5E | | | |
| 1:2ND COLOR | 60 | 66 | 6C | 72 | 78 | 7E | 84 | 8A | 90 | 96 | 9C | A2 | A8 | AE | B4 | BA | | | |
| | 62 | 68 | 6E | 74 | 7A | 80 | 86 | 8C | 92 | 98 | 9E | A4 | AA | B0 | B6 | BC | | | |
| | 64 | 6A | 70 | 76 | 7C | 82 | 88 | 8E | 94 | 9A | A0 | A6 | AC | B2 | B8 | BE | | | |
| 2:1ST COLOR | C0 | C6 | CC | D2 | D8 | DE | E6 | EC | | | | | | | | | | | |
| | C2 | C8 | CE | D4 | DA | E0 | E8 | EE | | | | | | | | | | | |
| | C4 | CA | D0 | D6 | DC | E2 | EA | F0 | | | | | | | | | | | |
| 2:2ND COLOR | 120 | 126 | 12C | | | | | | | | | | | | | | | | |
| | 122 | 128 | 12E | | | | | | | | | | | | | | | | |
| | 124 | 12A | 12F | | | | | | | | | | | | | | | | |

RECEPTION DATA : DATA THAT WAS NOT REGISTRATION ADJUSTED

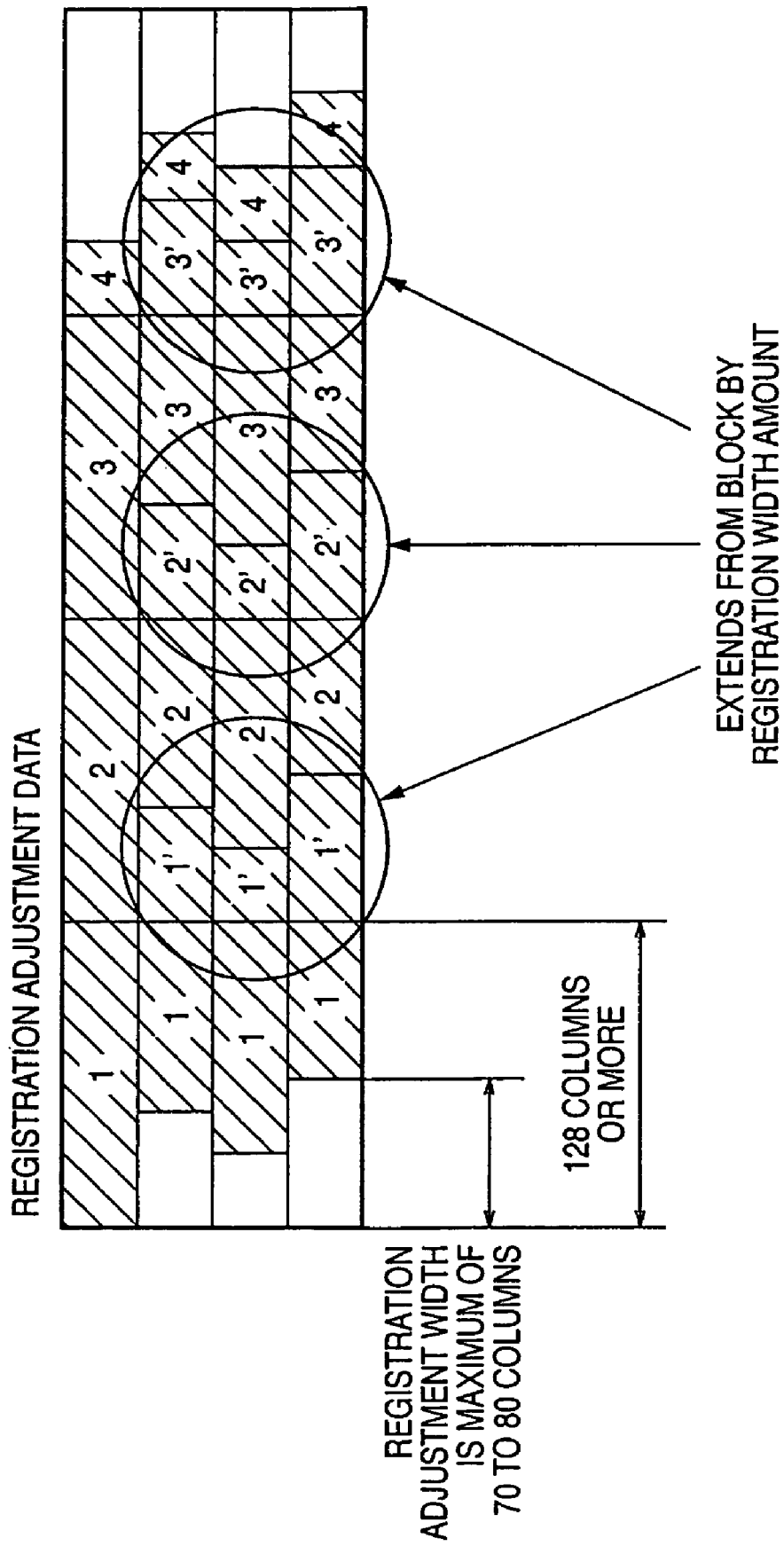

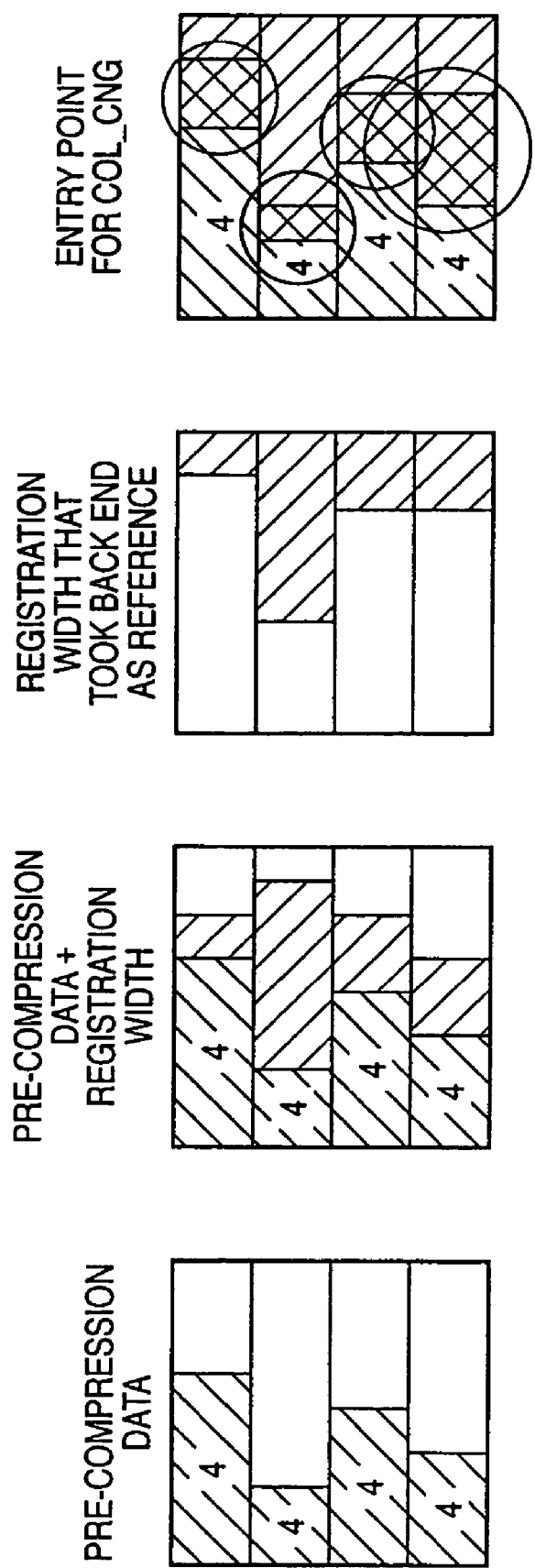

RECORDING APPARATUS, DATA PROCESSING METHOD FOR RECORDING APPARATUS, AND RECORDING SYSTEM

FIELD OF THE INVENTION

The present invention relates to a recording apparatus, a data processing method for a recording apparatus, and a recording system and, more particularly, to a process of recording data in a recording apparatus which records by scanning a recording head having a plurality of recording element arrays in which a plurality of recording elements are aligned in a predetermined direction, in a direction intersecting with the alignment direction of the recording elements.

BACKGROUND OF THE INVENTION

A printer that records information such as characters or images on a sheet-like recording medium such as a paper sheet or film is widely used as an information output apparatus for word processors, personal computers, facsimile machines, and the like.

Various methods are known as recording methods for printers. An inkjet printing method can realize non-contact printing on a recording medium such as paper. This method has been attracting attention recently because it easily prints in color, and is quiet. As the configuration for an inkjet printing method, a serial recording system is well known that performs recording while reciprocally scanning a carriage mounted with a recording head that discharges ink in response to recording information in a direction intersecting the transport direction of a recording medium such as a paper sheet. In general, the serial recording system is widely used for reasons including low cost and easy downsizing.

In the serial recording system, recording is carried out by scanning a carriage mounted with a recording head over a recording medium. Therefore, in a recording apparatus (printing apparatus) according to the serial recording system, a recording area in the scanning direction of the recording head is divided into a plurality of areas, and the apparatus has a buffer that stores recording data in units for the divided areas.

In this type of recording apparatus, when storing recording data in units for divided areas in a buffer, the apparatus compares information that changes the storage area of recording data for each color with the remaining amount of buffer available for storage and a write address update amount. The recording apparatus includes a writing control section that controls write address information of recording data of unit areas for each color based on the comparison result (Japanese Patent Laid-Open No. 2003-305896).

The recording apparatus further comprises a reading control section that controls, for each color, reading address information for reading recording data that was stored in the buffer, and record data generating means that generates recording data of the divided area units in accordance with the recording data that was read based on the reading address information.

For recording data to be transferred from a host computer to a conventional recording apparatus configured in this manner, the host computer (printer driver) performs adjustment (registration adjustment) of positions in the scanning direction (raster direction) (Japanese Patent Laid-Open No. 2003-305895).

In a recording head configured with a short recording element array (i.e. the number of recording elements constituting a single recording element array is small), a deviation width caused by an installation error (inclination with respect to a reference angle) that is produced when installing (attaching) the recording head falls within one pixel at most, and it is thus possible to ignore the influence thereof on a recording image. Therefore, it is not necessary to perform a correction or the like in relation to an installation error for this kind of recording head.

SUMMARY OF THE INVENTION

However, in recent years, increases in the length of recording heads are proceeding in low-cost recording apparatuses having a configuration which integrates a recording head and an ink tank. As a result, deviation widths caused by installation errors produced when attaching the recording head have begun to exceed one pixel, and it is thus no longer possible to ignore the effects on a recording image.

In order to correct an installation error (inclination with respect to a reference angle) produced when attaching this kind of recording head, it is necessary to adjust (registration adjustment) the positions corresponding to the inclination of each recording element array. However, for this position adjustment (registration adjustment), it is necessary to process data of 1 bit.

Recording data transferred to a recording apparatus is generally expressed by 1 bit (binary) representing recording/non-recording. However, the data processing unit of a host computer is generally set to 16 bits or 32 bits. It is therefore not efficient to process 1-bit data such as recording data at the host computer, and the processing takes a long time.

Recently, recording resolutions of recording apparatuses have increased and the amount of recording data transferred to recording apparatuses from host computers has also increased. As the amount of recording data increases, more time is required to generate the recording data at the host computer and to transfer the data thereafter. Accordingly, there is a decrease in the effective speed from the time recording is designated until the recording is actually executed at the recording apparatus.

For the above reasons, in order to effectively correct an installation error that occurs when attaching a recording head and also reduce the time until recording is executed after issuing a record instruction, it is necessary to reduce the time required by a host computer (printer driver) to generate recording data and transfer the data to a recording apparatus.

This invention was made in view of the foregoing circumstances, and an object of this invention is to effectively correct installation errors that occur when attaching a recording head and, at the same time, to speed up a recording data generation process and a transfer process at a host computer.

According to one aspect of the present invention, the above object is attained by a recording apparatus which records by scanning a recording head having a plurality of recording element arrays in which a plurality of recording elements are aligned in a predetermined direction, in a direction intersecting with the alignment direction, and comprises:

a first registration information that corresponds to a relative distance in a scanning direction between respective recording element arrays, which is sent from a connected host device;

a receiving buffer that stores setting data including a second registration information that corresponds to an inclination in a direction perpendicular to the scanning direction of each recording element array, and recording data of each recording element array;

a recording buffer that stores recording data of each recording element array in association with a recording position in the scanning direction; and writing control means that performs control to adjust a storage position of recording data based on the first and second registration information and store the data in the recording buffer.

Thus, in addition to a registration adjustment process associated with the relative distance between the recording element arrays that has conventionally been done in a host device, registration adjustment processing associated with an inclination in a direction perpendicular to the scanning direction of the recording element arrays produced by an installation error of the recording head is also executed on the recording apparatus side. Accordingly, an installation error produced when installing a recording head can be effectively corrected, while at the same time, simplifying processing to generate recording data at the host device. It is therefore possible to reduce the time until recording is actually performed upon designation of recording.

The second registration information may be a value obtained by converting an inclination into the number of recording pixels in the scanning direction.

The second registration information may be provided for each of predetermined the number of recording elements within each recording element array. Preferably, the apparatus further comprises reading control means that controls, for each recording element array, reading address information for reading recording data that is stored in a recording buffer, and recording control means that performs recording by driving each recording element array in accordance with recording data that is read based on reading address information.

Preferably, recording is performed by each recording element array in respectively different colors.

Preferably, the recording buffer is configured to divide a recording area in the scanning direction into a plurality of blocks, and stores the recording data in each block, and the writing control means has a register that stores, for each recording element array, information for identifying the existence or non-existence of data contained in the recording data, the raster number of the data, and registration information of the data.

The writing control means may control address information for storing in a recording buffer, in accordance with the existence or non-existence of recording data in the recording element arrays for each block.

Preferably, each recording element is configured so as to perform recording by discharging ink. More preferably, each recording element is configured to comprise a thermal energy converter for generating thermal energy to be applied to ink in order to discharge ink by using thermal energy.

According to another aspect of this invention, the above object is attained by a data processing method for a recording apparatus that records by scanning a recording head having a plurality of recording element arrays in which a plurality of recording elements are aligned in a predetermined direction, in a direction intersecting with the alignment direction, and comprises a receiving buffer that stores setting data and recording data of each recording element array that are sent from a connected host device, and a recording buffer that stores recording data of each recording element array in association with a recording position in the scanning direction, the method comprises:

a writing control step of controlling to adjust storage positions of the recording data of the recording element arrays and store the recording data in the recording buffer on the basis of a first registration information corresponding to a relative distance in a scanning direction between respective recording element arrays that is contained in the setting data and a second registration information corresponding to an inclination in a direction perpendicular to the scanning direction of each recording element array;

a reading control step of controlling, for each recording element array, reading address information for reading recording data that is stored in the recording buffer; and a recording control step of recording by driving each recording element array in accordance with recording data that is read out on the basis of the reading address information.

According to a still further aspect of this invention, the above object is attained by a recording system that includes a recording apparatus that records by scanning a recording head having a plurality of recording element arrays in which a plurality of recording elements are aligned in a predetermined direction, in a direction intersecting with the alignment direction, and a host device that is connected to the recording apparatus and sends setting data and recording data to the recording apparatus, wherein:

the host device sends, as the setting data, data including a first registration information corresponding to a relative distance in a scanning direction between respective recording element arrays, and a second registration information corresponding to an inclination in a direction perpendicular to the scanning direction of each recording element array; and the recording apparatus comprises a recording buffer that stores recording data of each recording element array in association with a recording position in the scanning direction, and performs control to adjust a storage position of recording data of each recording element array based on the first and second registration information, and store the data in the recording buffer.

The above object is also attained by a host apparatus comprising generating means that generates recording data to be output to a recording apparatus that records on a recording medium by scanning a recording head having a plurality of recording element arrays with respect to the recording medium, in block units corresponding to a plurality of divided areas in a scanning direction within a scanning recording area of the recording head on the recording medium, and output means that outputs an instruction including the recording data, the host apparatus further comprises:

registration information acquiring means that acquires a first registration information regarding a deviation of the recording element arrays of the recording head, and a second registration information corresponding to an inclination in a direction perpendicular to the scanning direction of the recording element arrays;

block count acquiring means that acquires the number of blocks corresponding to recording data that is recorded by a single scanning recording at the recording apparatus based on the generated recording data;

judging means that judges whether or not to modify the number of blocks that is acquired by the block count acquiring means based on the first and second registration information; and modifying means that modifies contents of the instruction when the judging means made a judgment to modify the number of blocks.

In addition, the above object is also achieved by a computer program which causes a computer apparatus to implement the above data processing method for the recording apparatus, and a storage medium that stores the computer program.

Other, features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 3A to 3E are views showing the structure of data that is transferred from a host computer and stored in a receiving buffer;

FIG. 4 is a view showing the data structure of a recording buffer that holds recording data;

FIG. 10 is a view for explaining an actual address when a registration adjustment value is not zero and there is an inclination correction;

FIG. 12C is a view that schematically illustrates a data state associated with registration adjustment;

FIGS. 13A to 13H are views showing a data configuration of an end block according to registration adjustment;

DETAILED DESCRIPTION OF THE PREFERRED EMBODIMENTS

Hereunder, preferred embodiments of this invention are described in detail by way of examples while referring to the attached drawings. The components described in the following embodiments are strictly for the purpose of exemplification, and the following description is not intended to limit the scope of the present invention solely to the these embodiments.

As used in this specification, the term "record" (may also be referred to as "print") refers not only to a case of forming significant information such as characters and graphics on a recording medium, but also refers broadly to cases of forming an image, design or pattern on a recording medium or to processing a medium, irrespective of whether the information is significant or insignificant or whether or not the information is manifested so that it can be visually perceived by a human.

Further, as used herein the term "recording medium" refers not only to paper that is used in an ordinary recording apparatus, but also refers broadly to material capable of accepting ink, such as cloth, plastic film, a metallic plate, glass, ceramics, wood or leather.

Furthermore, as used herein the term "ink" (may also be referred to as "liquid") should be broadly construed similarly to the definition of the above term "record (print)", and thus refers to a liquid that can be provided, by application onto a recording medium, for formation of an image, design, pattern or the like, to processing of a recording medium, or to processing of ink (for example, solidification or in solubilization of a coloring material in ink to be applied to a recording medium).

Further, unless specifically described otherwise, as used herein the term "nozzle" (may also be referred to as "recording element") refers to a discharging aperture or in general to a liquid channel communicating thereto and an element that generates energy to be utilized for discharging ink.

Hereunder, a specific description is given of an embodiment that applies the inkjet recording apparatus (printing apparatus) of this invention.

<Outline Configuration of the Recording Apparatus>

Figure 1:
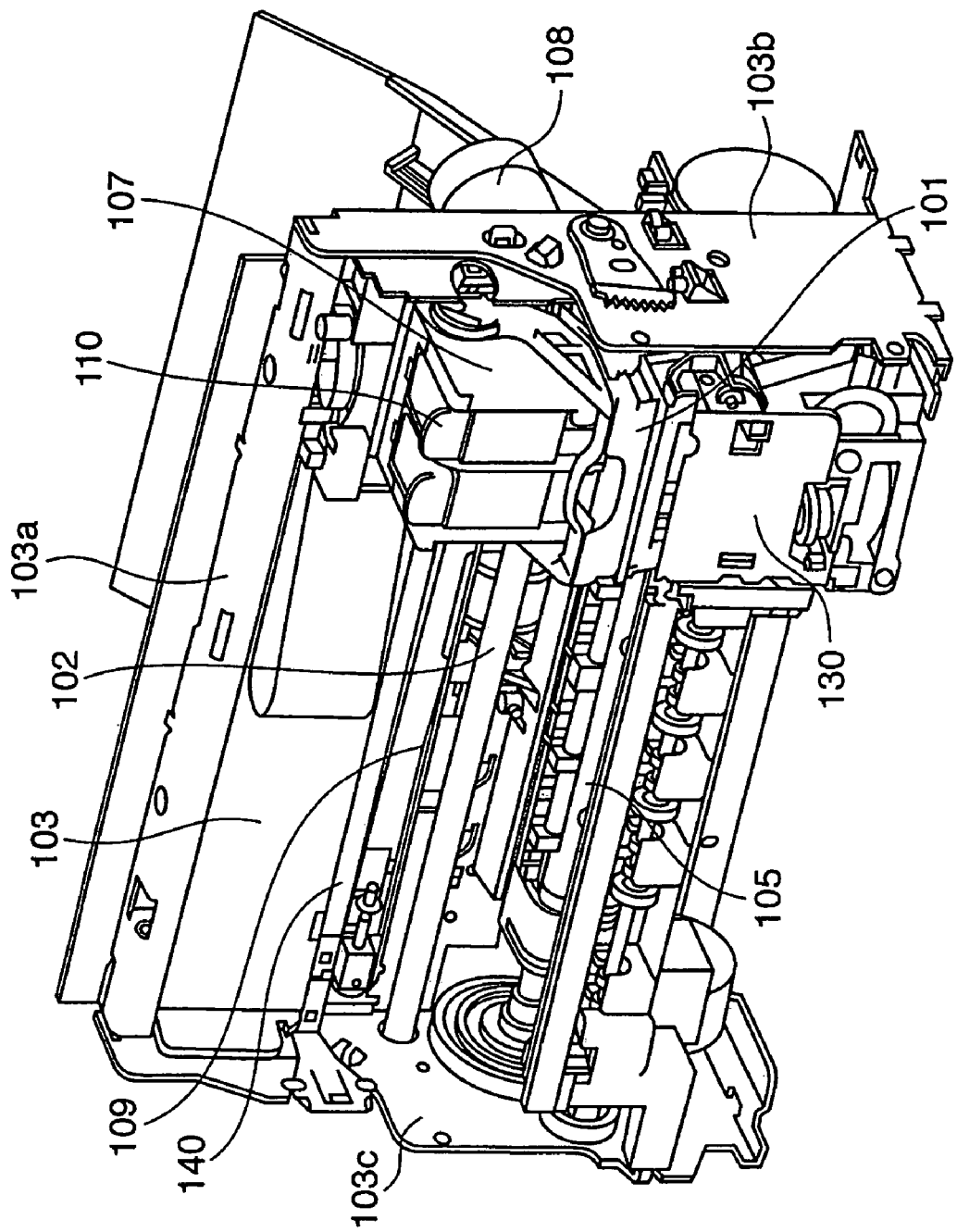
FIG. 1 is a perspective view showing an outer appearance of an inkjet recording apparatus as a preferred embodiment of this invention, in a state in which the cover has been removed.

FIG. 1 is a perspective view showing an outline configuration of an inkjet recording apparatus of this embodiment in a state in which the cover has been removed.

In FIG. 1, a recording cartridge 110 having a recording head and an ink tank provided in an integrated condition is mounted on a carriage 101, and the carriage 101 can travel along a guide shaft 102. In this embodiment, a recording head is a recording head of an inkjet printing system. Reference numeral 103 denotes a chassis that consists of a main chassis 103a and left and right side plates 103b and 103c. Reference numeral 108 denotes a carriage motor as the driving source of the carriage. Reference numeral 109 denotes a belt that is connected to the carriage and driven by the carriage motor 108. Reference numeral 130 denotes a recovery unit that performs cleaning and suction operations on a recording head discharging surface. Reference numeral 140 denotes a scale consisting of a CR encoder that calculates the position and speed of the carriage 101 and a light emitting element and a light receiving element that are mounted on the carriage.

A recording sheet serving as a recording medium is fed into the apparatus main body by a sheet feed roller (not shown). The recording sheet is then pinched by a sheet supply roller 105, a pinch roller (not shown) and a sheet press plate (not shown), and conveyed to the recording area of the recording cartridge 110 to perform recording.

The recording cartridge 110 includes two kinds of cartridges: a color recording cartridge that holds ink of three colors, i.e. yellow, magenta and cyan and a black recording cartridge that holds black ink. The two recording cartridges are separately inserted into a cartridge guide 7.

The inkjet recording apparatus of this embodiment is connected to a host computer, and records upon reception of recording data from the host computer (printer driver). The recording apparatus of this embodiment records by scanning the carriage supporting the recording cartridge 110 including a recording head on a recording medium. For this purpose, this recording apparatus divides a recording area of the recording head in the scanning direction into a plurality of areas, and records (prints) an image in each divided area.

Figure 2:
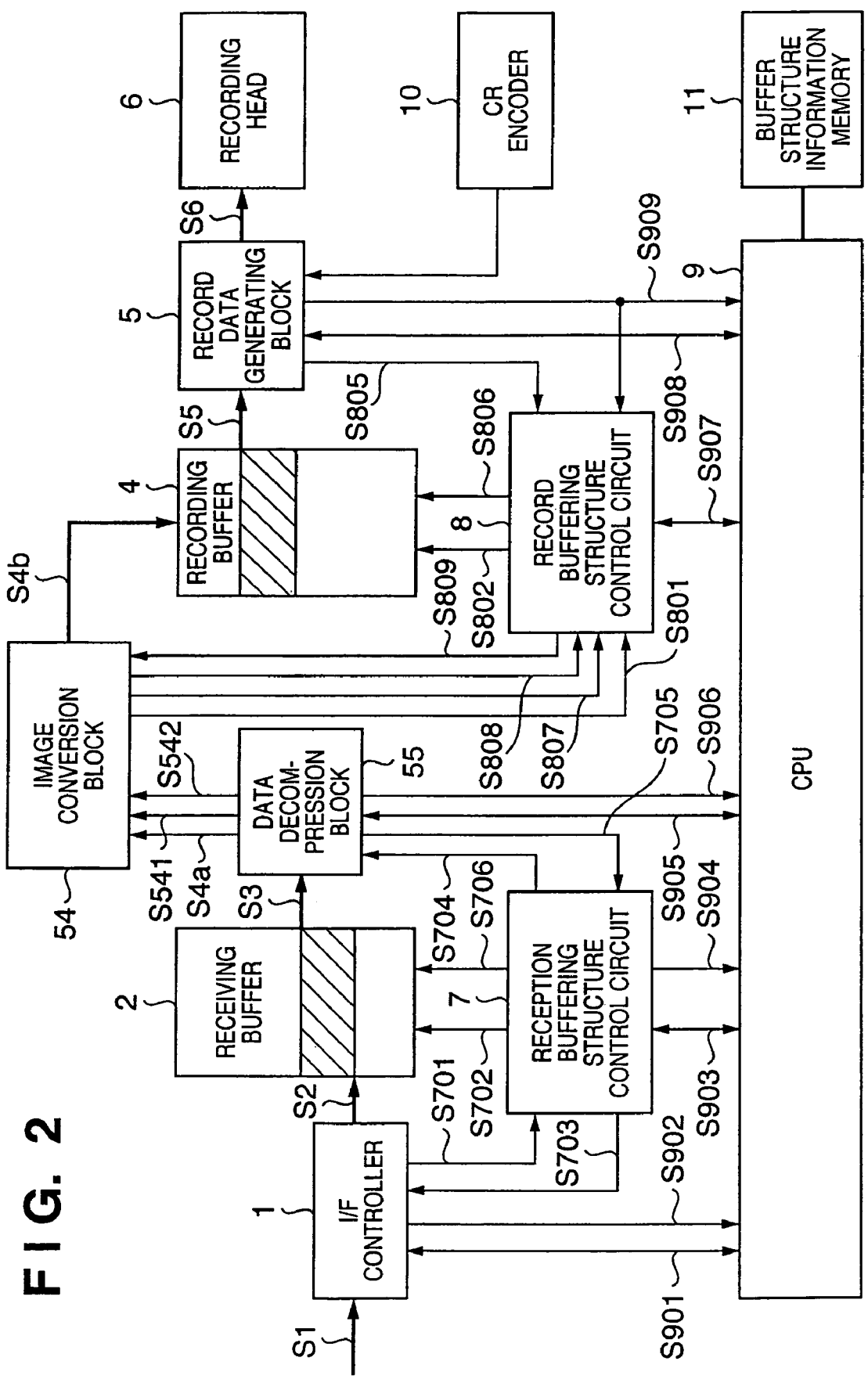
FIG. 2 is a block diagram showing the configuration of a record controlling section of the inkjet recording apparatus of FIG. 1.

In this case, according to the inkjet recording apparatus of this embodiment, the host computer does not perform positional adjustment (registration adjustment) of recording data in the scanning direction by a data process for each bit. Instead, registration adjustment of recording data is performed by a record buffering structure control circuit 8 in the recording apparatus, as shown in FIG. 2 to be described later. This makes it possible to speed up generation of recording data by the host computer and increase an effective recording speed.

<Configuration of Record Controlling Section>

FIG. 2 is a block diagram showing the configuration of a record controlling section of the recording apparatus of this invention. In the figure, reference numeral 1 denotes an interface controller that receives data transferred thereto from a host computer (not shown) through an interface signal line S1. The interface controller 1 extracts recording data and data required for operation of the recording apparatus from the received data to temporarily accumulate the data. Data that was extracted by the interface controller 1 is stored in a receiving buffer 2 via a signal line S2.

The receiving buffer 2 consists of a memory such as a SRAM or a DRAM, and data stored in the receiving buffer has a structure as shown in FIGS. 3A to 3B or 3C to 3E.

As represented by the data structure of the receiving buffer in FIG. 3A, "command" (201), "data length" (202), and "setting data" (203) are sequentially stored from the left. Subsequently, "command" (204), "data length" (205), and "setting data" (206) are stored. This indicates that data transferred in time series are stored at consecutive addresses in the receiving buffer. The setting data 206 is information representing execution of paper feed, setting of the paper supply amount, the number of recording heads for use, and the like. The recording apparatus can start to record only after all the pieces of information defined by the setting data are obtained. Subsequent to these data, recording data (209 and 212) to be recorded are stored in the receiving buffer 2.

The recording data (209 and 212) are data obtained by dividing a data amount necessary to record by scanning the recording head once on a recording medium into block units each having a smaller data amount. The recording data that were divided into block units are separated, and the data are sequentially stored as the first block data (209), second block data (212), and so forth.

FIG. 3B is a view showing in detail the data structure of recording data divided into block units. As shown in the figure, recording data for a plurality of colors (213 to 214) are sequentially stored as compressed data. The compression TAGs and compressed data are separated by "color change codes" (216, 217, 218).

For example, assuming recording data exists for four colors, i.e. cyan, yellow, magenta and black, a recording head is used which has, in the scanning direction, two nozzle arrays each having 64 nozzles in the longitudinal direction for each color. Since data of each nozzle array forms recording data of one color, compressed recording data for two nozzle arrays × four colors, that is, for the first color to the eighth color, are stored as recording data in one block data. The nozzles of each nozzle array are aligned in the transporting direction of the recording medium. For example, data of the first and second colors are recording data corresponding to cyan, data of the third and fourth colors are recording data corresponding to magenta, data of the fifth and sixth colors are recording data corresponding to yellow, and data of the seventh and eighth colors are recording data corresponding to black.

FIG. 4 is a view showing the data structure of the recording buffer that holds recording data. For example, when the recording apparatus records by a Length of about eight inches at maximum in the scanning direction by one scanning and one block data corresponds to a size that is enough to record about one inch in the scanning direction, an image of one scanning is completed by recording the recording data of a total of eight blocks. The first to eighth blocks are arranged in the scanning direction of the recording head, and each block data contains recording data of the first color to data of the eighth color. The length of recording data of each color stored in each block corresponds to the number of nozzles of the recording head.

Referring back to FIG. 2, each control block will be explained. Of data stored in the receiving buffer 2, "command", "data length", and "setting data" serving as setting values for controlling the recording apparatus are read out from an interface controller 1 by a CPU 9 via a signal line S902, and set in control circuits (7 and 8) in the figure (S903 and S907). The CPU 9 interprets the readout data (data corresponding to 201 to 208 in FIG. 3A), and centralizes the overall printing control of the recording apparatus in accordance with the result. For processing of the recording data, the CPU 9 activates a data decompression block 55 and causes it to execute processing.

As shown in FIG. 3B, the data decompression block 55 reads out three data "compression TAG", "compressed data", and "color change code" from the receiving buffer 2, and executes data rasterization control on the basis of these data. This embodiment employs PackBits compression as a data compression/decompression method. Therefore, when the compression TAG takes an 8-bit value of 00h to 7Fh, data are processed on the assumption that one to 128 non-contiguous data exist in the data area. Further, when the compression TAG takes an 8-bit value of FFh to 81h, the next 1-byte data is decompressed into two to 128 contiguous data. If 80h is read out by a data read process, data is processed as a color change code. Decompressed data is sent to an image conversion block 54 via a signal line S4a. The data undergoes HV conversion by the image conversion block, and the HV-converted data is stored in a recording buffer 4 via a signal line S4b.

The recording buffer 4 stores the decompressed recording data in the data structure shown in FIG. 4. The start data of the recording data for the first color of the first block is written at the top address of the recording buffer 4. Subsequent data are sequentially written by properly changing the address. An area capable of storing data for one color at the address of the recording buffer is determined by setting data first loaded by the CPU 9, and data larger than the value of the setting data cannot be written. In compressing recording data, the data size is limited in accordance with the setting data. Data after detecting a color change code are sequentially written from the top address of the recording data for the second color. Control of this address data is executed by the record buffering structure control circuit 8 (to be described later).

Write is repeated from the data for the first color to the data for the eighth color in the first block. If a color change code is detected after the end of writing the data for the eighth color, write of all the data of the first block is complete. The data decompression block 55 ends the data rasterization operation, notifies the CPU 9 by an interrupt (S906) of the completion of rasterizing data of one block, and waits for activation of next data rasterization from the CPU 9.

At a stage when the recording data of a plurality of blocks is arranged in the recording buffer 4, the CPU 9 activates a carriage motor (denoted by reference numeral 108 in FIG. 1) to start a recording operation. Thus, by carrying out recording by transferring recording data in synchronization with a carriage encoder (CR encoder) 10 while scanning the carriage with recording head 6 (recording cartridge 110) mounted thereon, an image can be completed on a paper surface (on a recording medium). After the recording head 6 completed scanning in the main scanning direction, transport means transports the recording medium in a sub-scanning direction. Thus, by repeatedly performing scanning of the recording head and transport of the recording medium, the recording of an image for one page is carried out.

A record data generating block 5 reads the block structure of recording data that exists on the recording buffer 4 through a signal line S5 at a timing synchronized with the CR encoder 10, in accordance with a value specified from the CPU 9, and outputs the data to a signal line S6 while converting it into a data structure that the recording head 6 can record. The record data generating block 5 holds information regarding the block widths (showing the length of blocks) within the recording buffer to be described later, and information regarding the height of each color of the blocks ("the number of rasters" of color data or "the number of nozzles" of the recording head).

Data areas read from the recording buffer 4 are cleared to zero in order to store the next recording data.

<Write/Read Control of Receiving Buffer>

As described above, the interface controller 1 writes data in the receiving buffer 2, and the data decompression block 55 reads only recording data from the receiving buffer 2. A reception buffering structure control circuit 7 controls the write addresses and read addresses at that time. The reception buffering structure control circuit 7 controls the top address and bottom address of the receiving buffer 2 as well as write addresses and read addresses.

Each time the reception buffering structure control circuit 7 accepts a write request signal (S701) that is received from the interface controller 1 it adds one address, and outputs this to the receiving buffer 2 as write address information (S702). When the reception buffering structure control circuit 7 reaches the bottom address of the receiving buffer 2, it performs control to return the write address to the top address of the receiving buffer 2.

When the receiving buffer 2 becomes full of data and the write address reaches (matches) a read address, it sends an instruction not to write the next data to the interface controller 1 through a signal line S703.

At this time, it also simultaneously notifies the CPU 9 with an interrupt signal of a signal line S904 that the receiving buffer 2 is in a state in which writing of data is not possible. The structure of the receiving buffer 2 can be set by the CPU 9 writing to an internal register using a bus of the signal line S903.

For read addresses, when the CPU 9 reads data in the receiving buffer 2 directly through a data read register in the reception buffering structure control circuit 7, in a case where the data decompression block 55 made a request through a data read request signal line S705 addresses are added one at a time and output as read addresses to the receiving buffer 2 through a signal line S706.

When the read addresses reach the bottom address, the reception buffering structure control circuit 7 performs control to return the read address to the top address of the receiving buffer 2. Further, when a read address reaches (matches) a write address, since the data was eliminated from the receiving buffer the reception buffering structure control circuit 7 sends an instruction not to read the next data to the data decompression block through a signal line S704. At this time, it also simultaneously notifies the CPU 9 with an interrupt signal line of the signal line S904 that there is no data to be read in the receiving buffer 2.

The foregoing is a description of the processing contents of write and read control of data with respect to the receiving buffer 2. Next, process contents for writing, in the recording buffer, data which is read out from the receiving buffer 2 and rasterized, or reading out data from the printing buffer will be explained.

<Write/Read Control of Recording Buffer>

The image conversion block 54 writes recording data to the recording buffer 4, and the record data generating block 5 reads the recording data that was written. At that time, the record buffering structure control circuit 8 controls the write addresses and read addresses.

The record buffering structure control circuit 8 controls the top address and bottom address of the recording buffer as well as the write addresses and read addresses.

Each time the record buffering structure control circuit 8 accepts a write request signal (S801) that is received from the image conversion block 54 it changes the address appropriately, and outputs this to the recording buffer 4 as write address information (S802). When the record buffering structure control circuit 8 reaches the bottom address of the recording buffer 4, it performs control to return the write address to the top address of the recording buffer 4.

When a write address reaches (matches) a read address indicating that the recording buffer 4 has become full of data, it sends an instruction not to write the next recording data to the image conversion block 54 through a signal line S809.

Further, when the data decompression block 55 reads a color change code from the receiving buffer 2, the data decompression block 55 notifies the image conversion block 54 to that effect through a signal line S541. The image conversion block then outputs to the record buffering structure control circuit through a signal line S807. The record buffering structure control circuit 8 prepares to output a top address for storing data of the next color from the signal line S802. The structure of the recording buffer 4 can be set by the CPU 9 writing to an internal register using the bus of the signal line S907.

When the record data generating block 5 sends a request through a data read request signal line S805 for each color, read addresses are added one at a time and output to the recording buffer 4 through a signal line S806.

When a read address reaches the bottom address, the record buffering structure control circuit 8 performs control to return the read address to the top address of the recording buffer 4.

The record data generating block 5 sets the data structure of the recording data block that is currently being read, in a register inside the record data generating block 5 through the bus of a signal line S908 from the CPU 9. When all of the recording data in the recording data block structure that was set has been read, the record data generating block 5 sends a termination signal S909 to the CPU 9 as an interrupt signal. At this time, if the next recording data block is already expanded on the recording buffer 4, it writes that recording data block structure in the register.

The recording buffer 4 controls writing of data in units of one recording data block, and it does not activate a record data generating block for a recording data block that has not been written. Accordingly, a case will not occur in which the read addresses of the recording buffer exceed the write addresses. Reference numeral 11 denotes a buffer structure information memory. This is a working memory (work RAM) for controlling the recording buffer, and is an area that temporarily stores information regarding a recording buffer to be described later.

<Description of Record Buffering Structure Control Circuit>

Figure 5:
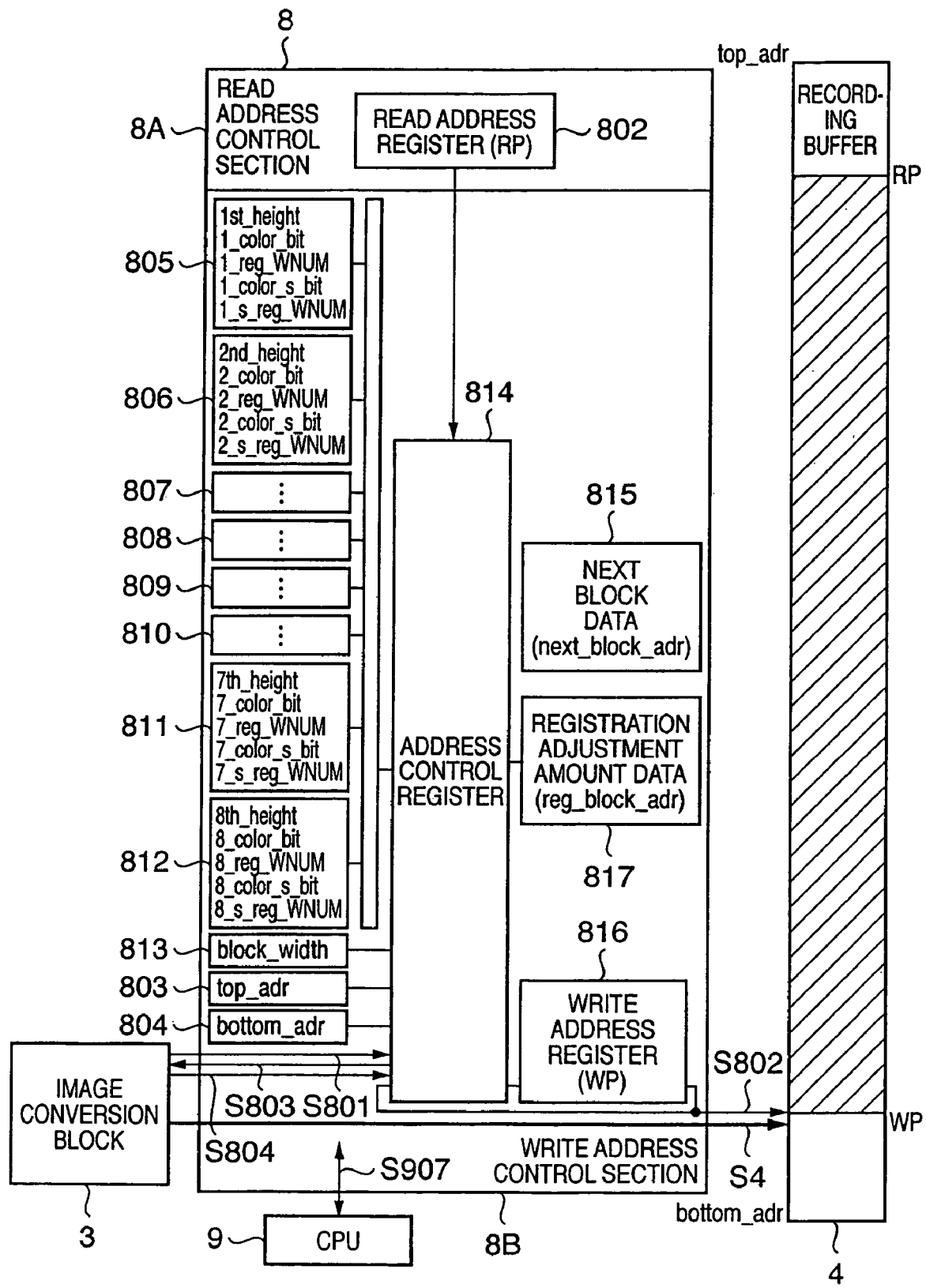
FIG. 5 is a view for explaining write address control of a record buffering structure control circuit.
Figure 8:
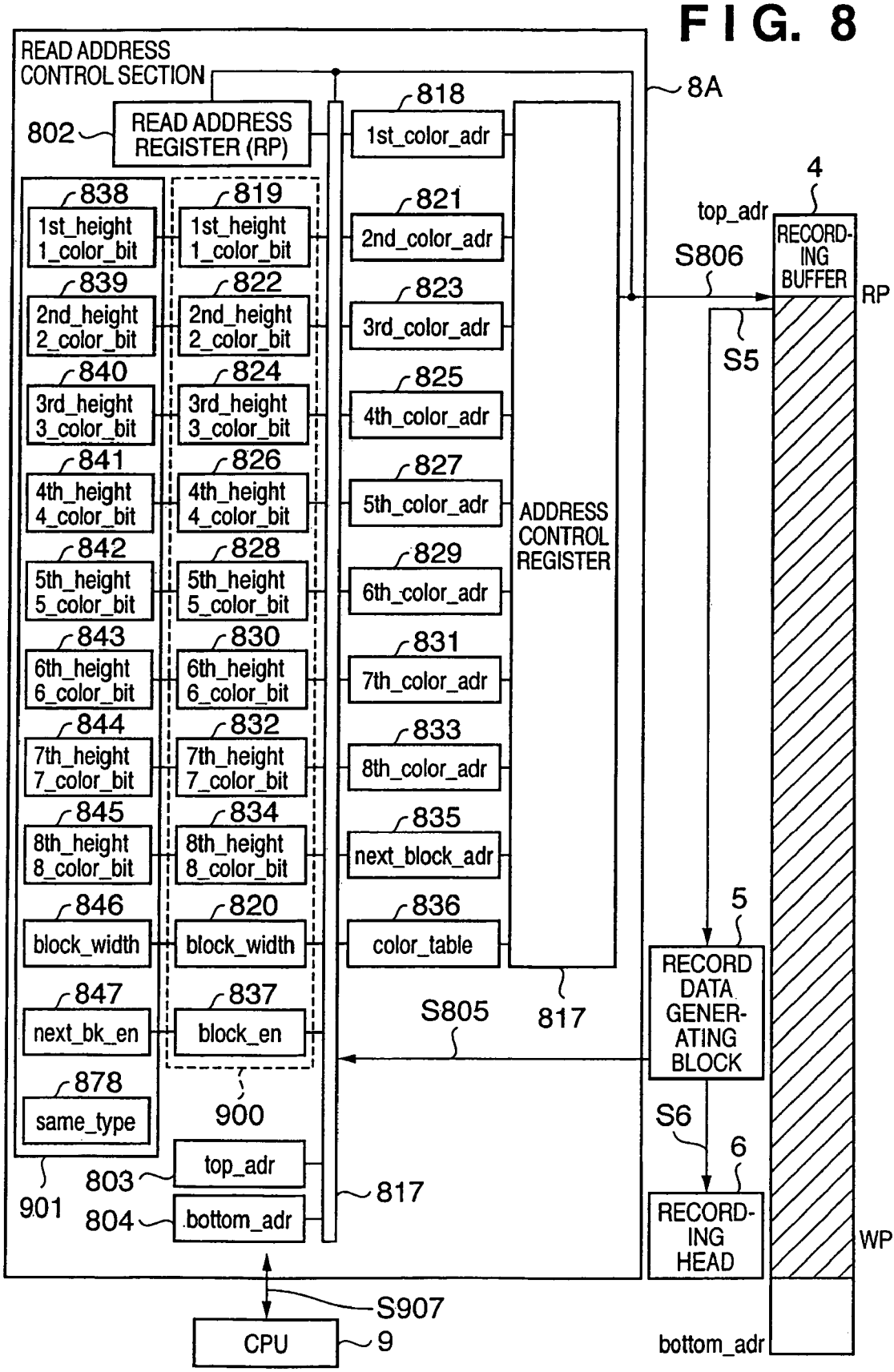
FIG. 8 is a view for explaining a process of reading out data from the recording buffer by the record buffering structure control circuit.

The record buffering structure control circuit will be described with reference to FIGS. 5 and 8. Among the processes performed by the record buffering structure control circuit, FIG. 5 is a view for mainly explaining write address control, and FIG. 8 is a view for mainly explaining read address control by the record buffering structure control circuit 8.

The record buffering structure control circuit 8 comprises a reading control section 8A and a write address control section 8B. In the buffer area of the recording buffer 4, a top address of the recording buffer is indicated by top_adr and a bottom address is indicated by bottom_adr. This top address is stored in a register 803 inside the write address control section 8B, and the bottom address is stored in a register 804 inside the write address control section 8B.

Reference characters "RP" shown at the recording buffer 4 denote a read pointer, and reference characters "WP" denote a write pointer. A hatching portion between reference characters RP and WP in the recording buffer indicates that recording data is stored therein. White portions of the recording buffer 4 indicate that recording data is not stored therein.

Reference numeral 802 within the read address control section 8A denotes a register showing a read address (RP: read pointer) of data. Reference numerals 805 to 812 denote registers that store information for each color of the first to eighth colors. In this example, in the register 805 is stored buffer height information of the first color data (1st_height), information indicating the existence or non-existence of data for the first color (1_color_bit), registration adjustment value information of the first color (1_reg_wnum), information indicating the existence or non-existence of an inclination correction for each nozzle of the first color (1_color_s_bit), and registration adjustment value information of inclination corrections for each nozzle of the first color (1_s_reg_wnum). The same information is set in a similar manner in registers 806 to 812 for the second to eighth colors.

Since the registration adjustment value information (1_reg_wnum) is a value corresponding to the relative position between nozzle arrays in the raster direction, it always takes the same value for one nozzle array. More specifically, each nozzle array has one registration adjustment value information. For example, letting the first nozzle array be a reference, the registration adjustment value information for the recording data for the first color is 0. If the distance between the second nozzle array and the first nozzle array is A columns, the registration adjustment value information for the recording data for the second color is A. If the distance between the third nozzle array and first nozzle array is B columns, the registration adjustment value information for the recording data for the third color is B. In this manner, registration adjustment value information for recording data for the second to eighth color is set in correspondence with the relative distances to nozzle arrays from the reference defined by the position of the first nozzle array for recording data for the first color.

Further, information indicating the existence or non-existence of an inclination correction for each nozzle (1_color_s_bit) is used by dividing a single nozzle array every predetermined the number of nozzles, for example, every 16 nozzles.

For example, when the number of nozzles comprising a nozzle array is 128, the nozzle array is divided into eight equal parts. With this information, for example, even when the number of nozzles to be used for recording is half, recording can be performed by changing only the existence or non-existence of an inclination correction, without changing the registration adjustment value information of inclination corrections for each nozzle (1_s_reg_wnum).

Similarly to the information indicating the existence or non-existence of an inclination correction for each nozzle (1_color_s_bit), the registration adjustment value information of inclination corrections for each nozzle (1_s_reg_wnum) is also used by dividing a single nozzle array every predetermined the number of nozzles, for example, every 16 nozzles (hereunder, a nozzle group that takes 16 nozzles as a unit is also called a "nozzle row"), and the same value is always used for nozzles of the same row. More specifically, registration adjustment value information for an inclination correction is held for each row.

For example, when the top end of the nozzles is taken as a reference, the registration adjustment value information for an inclination correction for data of the first 16 nozzles (first nozzle row: 1st nozzle to 16th nozzle) is 0, and if a deviation in the column direction between the next 16 nozzles (second nozzle row: 17th nozzle to 32nd nozzle) and the first 16 nozzles (first nozzle row) is the amount of A column, the registration adjustment value information for an inclination correction for data of the second row is A. Further, if a deviation in the column direction between the next 16 nozzles (third nozzle row: 33rd nozzle to 48th nozzle) and the first 16 nozzles (first nozzle row) is the amount of B column, the registration adjustment value information for an inclination correction for data of the third nozzle row is B. In this manner, by taking the position of the first 16 nozzles (first nozzle row) of each nozzle array as a reference and employing nozzle rows that comprise 16 nozzles as a unit, the value for a deviation in the column direction that is produced in correspondence with an installation angle is set as the registration adjustment value information for an inclination correction.

Reference numeral 813 denotes a register which sets block width information (block_width). This width information is a value that is commonly used for each block from the first to eighth colors.

The above height information, width information and registration adjustment value information of the block are contained in the setting data described in FIG. 3A.

Reference numeral 815 denotes a register that stores the address of the next block data. This address can be decided using a value from any of the registers from register 805 to register 812 that store information relating to each color and the value of the register 813 that stores width information relating to block data. The writing control section 8B decides the write start address of the second block data as the next write object in accordance with setting information relating to the first block data as a write object, and stores the address in this register.

Reference numeral 817 denotes a register that stores a write start address of a registration adjustment amount. This address can be decided using values of all of the registers from register 805 to register 812 that store information relating to each color and the value of the register 813 that stores width information relating to block data. The writing control section 8B decides the write start address of the registration adjustment amount as the next write object in accordance with setting information relating to the first block data as a write object, and stores the address in this register.

In this connection, for example, with respect to data of the first color, before completing the writing of recording data corresponding to data of the first block, the writing control section 8B decides write start address information for the second block that reflects the registration adjustment width amount for the data of the first block. The same applies for the data of the other colors (data of the second color to data of the eighth color).

Before completing the writing of recording data corresponding to the first block data, the writing control section 8B can update the write address information for the registration width amount of the first block data to the write start address that was decided.

Reference numeral 816 denotes a register that stores a write address (WP) of data.

Reference numeral 814 denotes an address control register that manages read processing and write processing so as to prevent the write address (WP) from exceeding the read address (RP) (prevent the two addresses from designating the same address).

<Data Storage in Recording Buffer (FIGS. 6A to 6D)>

Figure 6A:
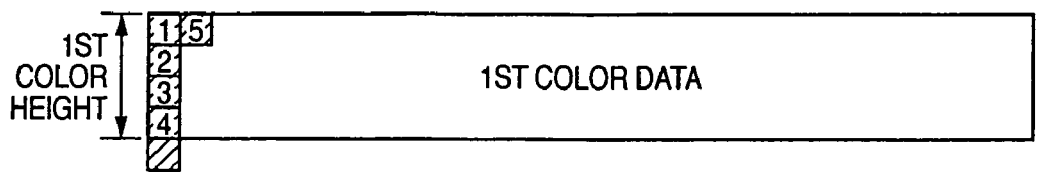
FIGS. 6A to 6D are views for explaining the manner in which recording data is stored in a recording buffer.

FIGS. 6A to 6D are view that illustrate the manner in which recording data is stored in the recording buffer 4. FIG. 6A illustrates a state in which data as the data of the first color is stored vertically in sequence in amounts of four words. In this example, one word corresponds to 16 pixels. Assuming that addresses for storing information in a register are incremented one at a time, the write pointer (WP) is counted in the manner 1→2→3→4→5→ . . . .

For example, in the settings for the register of FIG. 6A, the value (1st_height) for buffer height information (the number of rasters) is "4", and the value for information indicating the existence or non-existence of data is "1 (exists)". The value of the register 813 (block width information: block_width) is "28".

Figure 6B:
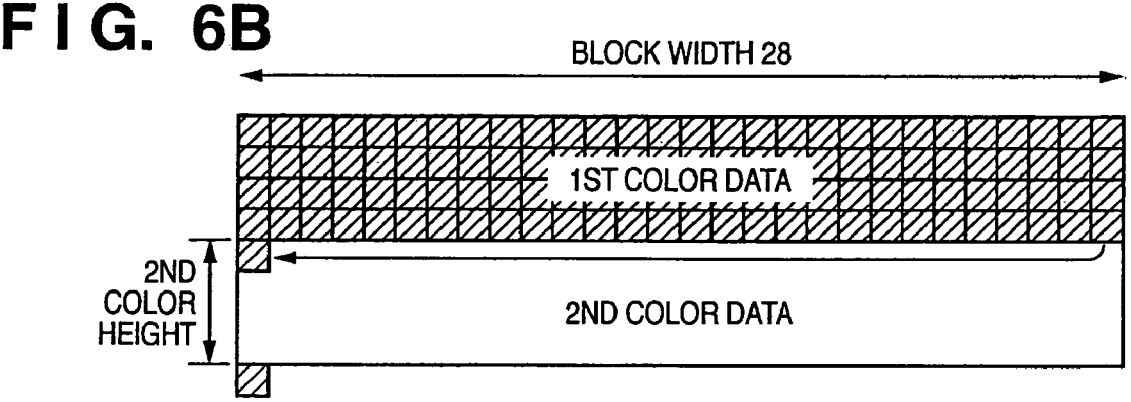
Figure 6C:
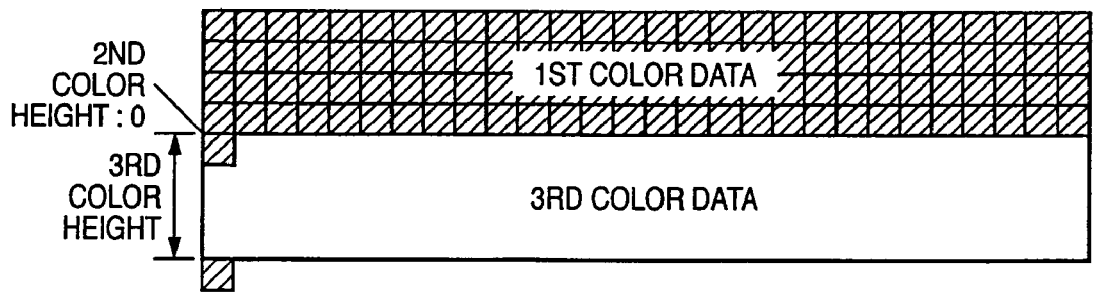

FIG. 6B illustrates writing of data to the recording buffer 4 when data exists for a second color. After storing all the data in the storage area for the first color, the write pointer (WP) moves to the top address of the second color as shown by the arrow, and storing of the second color data is performed. FIG. 6C shows a case in which, when there is no data for a second color, data of a third color is stored following the storage area for the data of the first color. In this case, the value of information indicating the existence or non-existence of data of a second color (2_color_bit) of the register 806 shown in FIG. 5 is "0 (none)", indicating that no data exists. Alternatively, if the buffer height information (2nd_height) is "0", this information may also be used since it indicates that no data exists. Alternatively, an AND operation may be performed for the information indicating the existence or non-existence of data and the buffer height information, and a decision may be made using that result.

Figure 6D:
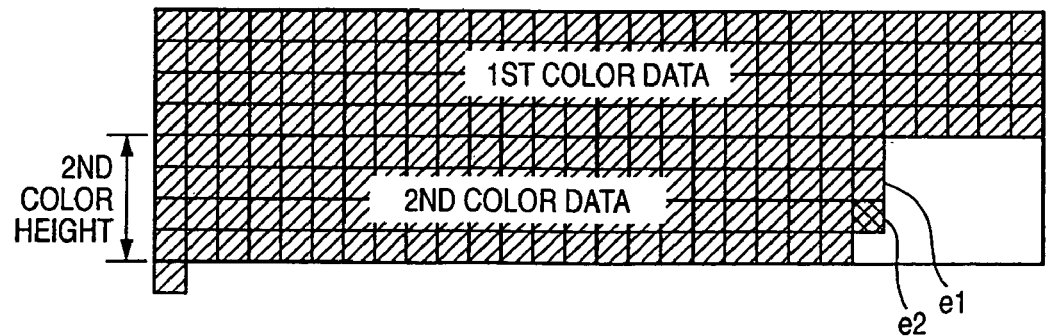

FIG. 6D illustrates, for data of the second color, that writing of a write position denoted by reference numeral e1 (WP: write pointer) stops before a read position denoted by reference numeral e2 (RP: read pointer). This control is performed to prevent overwriting by prohibiting writing of data at a position at which reading is not completed. The above control similarly applies to areas of the third color to eighth color.

<Process to Store Data in Recording Buffer>

Figure 9:
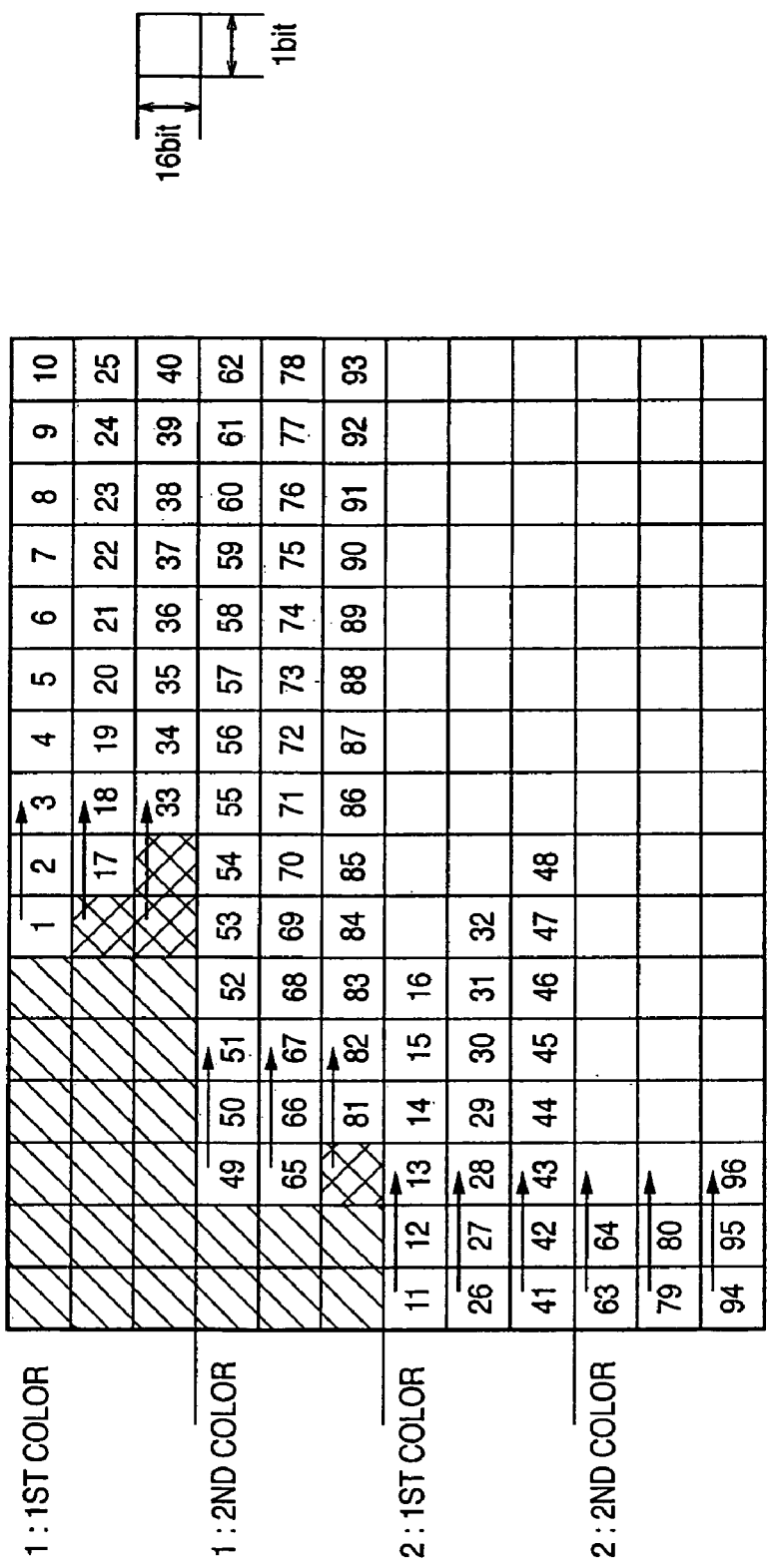
FIG. 9 is a view for explaining the order of writing data when a registration adjustment value is not zero and there is an inclination correction.

FIGS. 9 and 10 are views that illustrate the manner in which recording data is stored in the recording buffer 4 when registration adjustment value information is not zero and the registration adjustment value information for an inclination correction (hereunder, also referred to simply as "inclination correction value") is also not zero. FIGS. 9 and 10 illustrate a state in which data as the data of the first color is stored vertically in sequence in three word amounts. In this example one word corresponds to 16 pixels.

In this example, FIG. 9 is a view showing the input sequence, and FIG. 10 is a view showing the addresses that are actually written.

The diagonally shaded areas in FIGS. 9 and 10 indicate a registration adjustment value (6) of the first color, and the cross-hatching areas indicate inclination correction values (0, 1, 2) of each nozzle row. Although the actual write starting positions are from the positions shown in FIG. 9, the actual addresses start from positions reached after positions have been skipped or shifted in correspondence with the registration adjustment values, as shown in FIG. 10. For example, in case of the first raster, the position is denoted by a reference numeral 24 that is the seventh position from the left, because the sum of the registration adjustment value and the inclination correction values are 6. The same is applied to the second raster and the third raster. Since FIGS. 9 and 10 correspond, for example, the address of the data to be written first is denoted by reference numeral 24 in FIG. 10 and the address of the data to be written second is denoted by reference numeral 2A in FIG. 10

In this example, in the setting for the register of the first color in FIGS. 9 and 10, the value (1st_height) of buffer height information (the number of rasters) is "3", and the value (1_color_bit) of information indicating existence or non-existence of data is "1 (exists)". The value of register 813 (block width information: block_width) is "16", the registration adjustment value (1_reg_wnum) is 6, and the value of information indicating the existence or non-existence of an inclination correction for each nozzle row (1_color_s_bit) is "1 (inclination correction exists)" for the first, second and third nozzle rows only, and for other nozzle rows the value is "0 (no inclination correction)". Further, the inclination correction value (1_s_reg_wnum) of each nozzle row is "0, 1, 2" in sequence from the first nozzle row.

In the setting for the register of the second color in FIGS. 9 and 10, the value (2nd_height) of buffer height information (the number of rasters) is "3", and the value (2_color_bit) of information indicating existence or non-existence of data is "1 (exists)". The value of register 813 (block width information: block_width) is "16", and the registration adjustment value (1_reg_wnum) is 2. The value of information indicating the existence or non-existence of an inclination correction for each nozzle row (1_color_s_bit) is "1 (inclination correction exists)" for the third nozzle row only, and for other nozzle rows the value is "0 (no inclination correction)". The inclination correction value (1_s_reg_wnum) for each nozzle row is "0, 0, 1" in sequence from the first nozzle row.

In this example, the apparatus has a counter that show the height (nozzle row) being currently written and the counter is counted down each time writing of one nozzle row finishes. The counter value is set to the "height of each color −1" when starting writing. For example, in FIG. 9, the counter value for the first nozzle row is "2", the counter value for the second nozzle row is "1", and the counter value for the lowest nozzle row (third) is "0".

When the next countdown begins after the counter value reaches "0", the initial value "height of each color −1" is reset.

Thus, the value of the counter is counted down in units (for example, in amounts of 16) that correspond to the recording head's nozzle rows that consist of predetermined the number of nozzles. Each time the counter is counted down, the existence or non-existence of an inclination correction is judged for the next nozzle row, and when an inclination correction exists the corresponding inclination correction value is referred to from the setting register.

When the counter is counted down when the counter value has reached "0", the register of information indicating the existence or non-existence of an inclination correction for that nozzle row is referred to from the top.

Therefore, by updating the inclination correction values for each row of 16 nozzles and carrying out an operation with a registration value (1_reg_wnum), the final registration adjustment value to be corrected is determined.

The values used for the inclination correction value (1_s_reg_wnum) will now be described referring to FIGS. 7A and 7B.

Inclination correction values (1_s_reg_wnum) exist in a plus direction and minus direction with respect to a reference. FIG. 7A shows an example in which an inclination correction value is plus, and FIG. 7B shows an example in which an inclination correction value is minus.

Figure 7A:
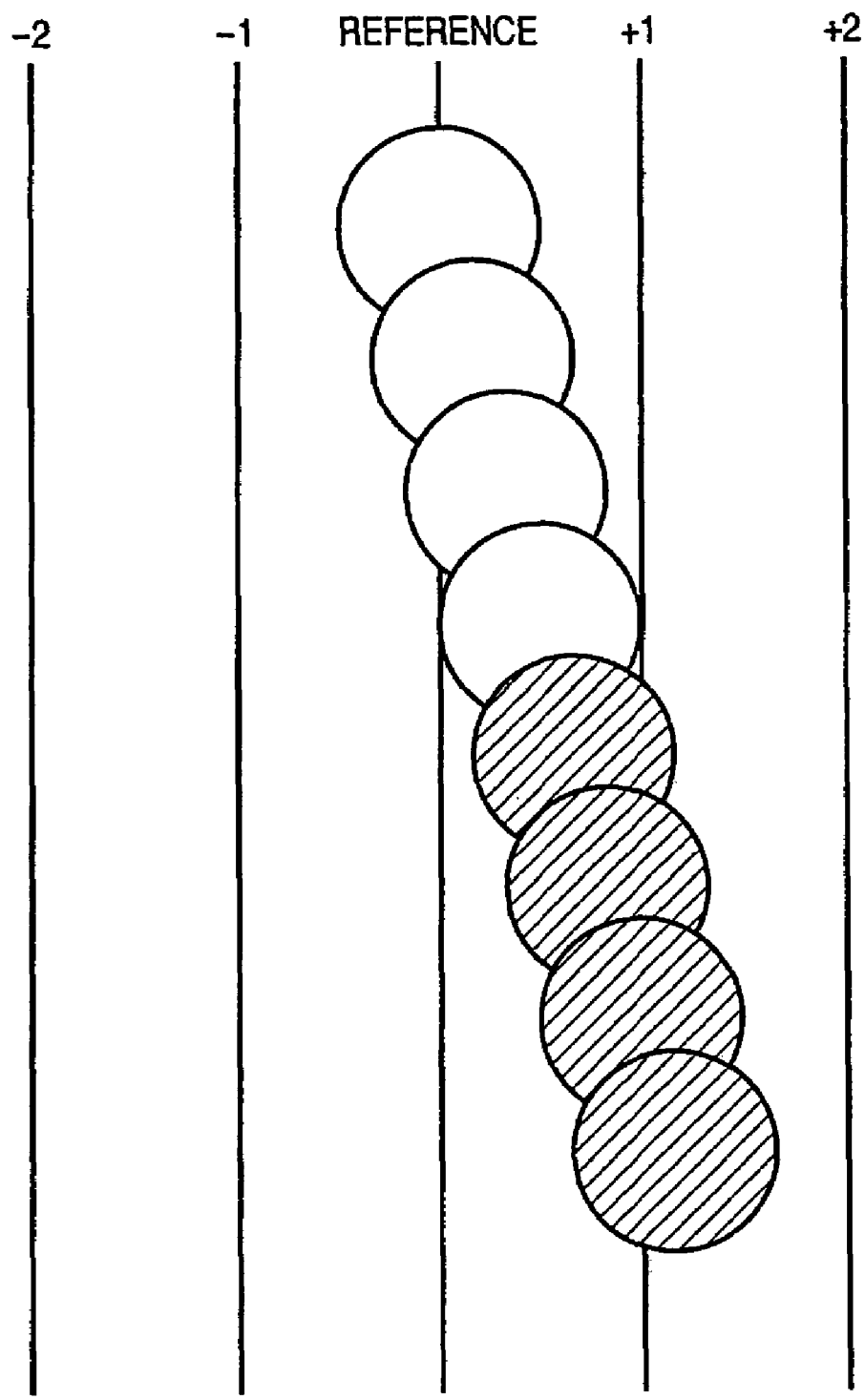
FIG. 7A is a view illustrating an example in which an inclination correction value is a plus value.

When an inclination correction value is plus, as shown in FIG. 7A, it is sufficient to perform addition processing as processing by hardware.

Figure 7B:
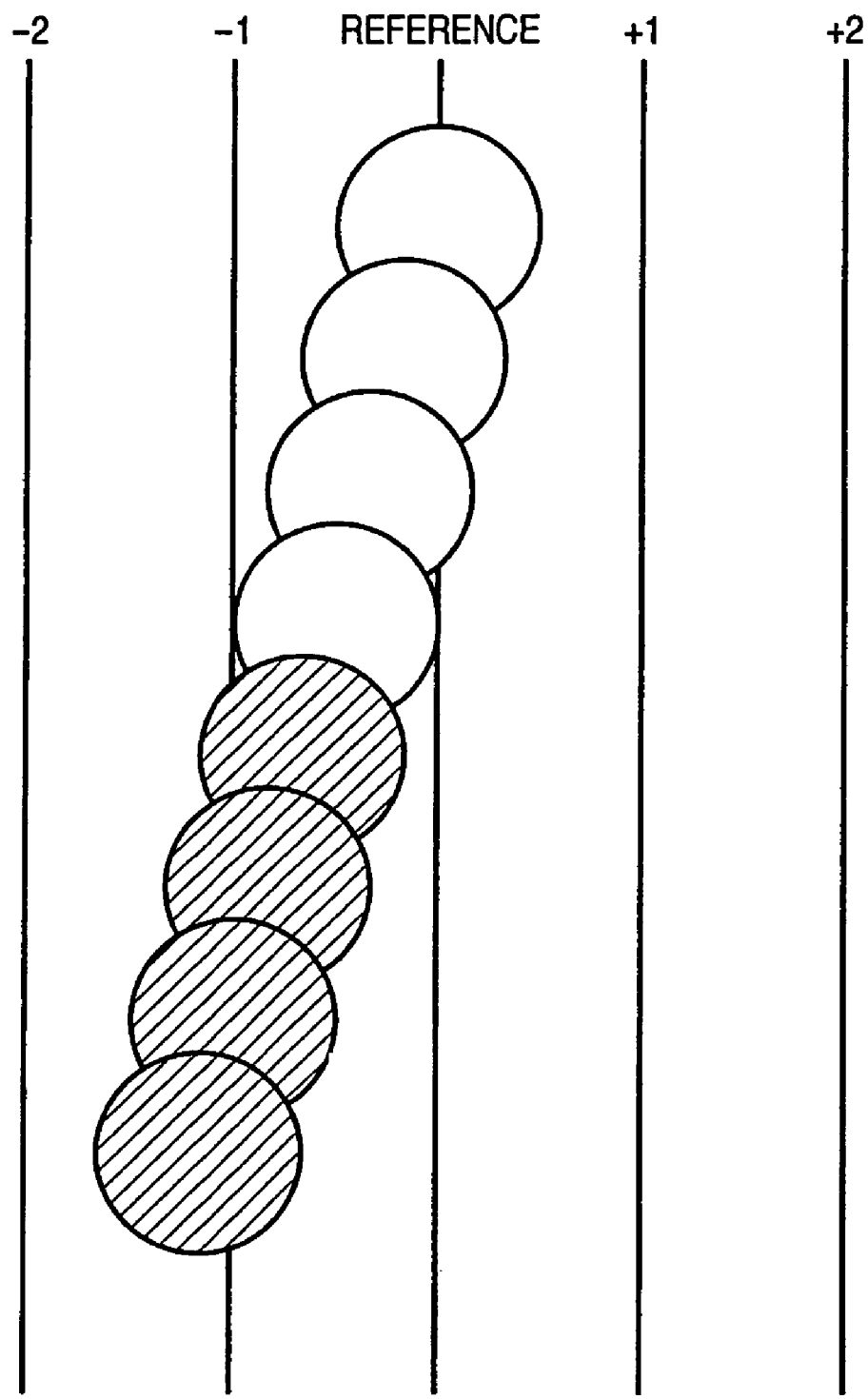
FIG. 7B is a view illustrating an example in which an inclination correction value is a minus value.

In contrast, when an inclination correction value is minus, as shown in FIG. 7B, one of two methods can be selected as the processing to be performed by hardware. One method performs subtraction processing and the other method performs addition processing.

A method that introduces an offset value is available as a method that performs addition processing for a minus value as shown in the example in FIG. 7B. For example, it is assumed that an inclination correction value can only be taken up to a maximum of "±3". In this example, offset by 3 is performed on the plus side when "3" is taken as a value set in the register when the inclination correction value is "0". Thus, the value set in the register is "0" when the inclination correction value is "−3", and the value set in the register is "6" when the inclination correction value is "+3".

However, when a constant value is offset in this way, it means a value (in this case, 1_reg_wnum −3) is set that was obtained by subtracting the offset amount from a registration adjustment value (1_reg_wnum).

By offsetting a constant value in this way, it is possible to perform addition processing for all inclination correction values, enabling efficient use of hardware.

Further, for example as shown in FIG. 9, when addresses to store information in the register are incremented one at a time to the right, the actual addresses of the write pointer (WP) in FIG. 10 are counted up in the manner 0→6→C→12→18→ . . . .

In this example, the sequence of writing data may be one that proceeds to the nozzle row that is one row underneath in units of 16 as shown in FIG. 9 and FIG. 10, or may be one that moves to the nozzle row that is one row underneath after proceeding as far as the block width (units of 10) according to the order of receiving data (in FIG. 9, proceeding to position 17 after position 10).

Further, as shown in FIG. 9, for data of the first color, after data was written (stored) up to the tenth data, the destination for writing the 11th data is the top of the next block (second block). This is done to write data that could not be completely entered into the current block (first block) by performing registration adjustment. In this example, the fact that the data to be stored at the top of the second block is the 11th data can be determined by the calculation 16−6+1=11, based on the value "16" of the register 813 and the registration adjustment value "6". This may be done by providing a counter that stores data, and adopting a configuration that specifies the top address of the second block when the counter reaches 10.

In FIG. 9, the address to store the 11th data of the first color data can be determined based on the number of colors (2) to be stored in the first block, the height of each color (3) and the block width (16).

When writing of a registration adjustment amount is completed (in FIG. 9, when writing of the 16th data is completed), the 17th data is written from the current block (first block). More specifically, in FIG. 10 the actual address is DE for the 16th data and is 2C for the 17th data.

Thus, the data of the first color is written while performing registration adjustment by alternating between the current block (first block) and the next block (second block).

When writing of the entire data of the first color is completed, the same processing is performed for the second and subsequent colors of the first block.

Further, addresses for storing information in the register may be incremented one at a time vertically, as shown in FIG. 6A, to cause the actual addresses of the write pointer (WP) to be counted up in the manner 0→2→4→6→8→ . . . .

In this example, the reason the addresses for storing information in the registers in FIGS. 9 and 10 are not incremented one at a time vertically is to enable a flexible response to changes in data from the image conversion block 3 or data from the host.

For example, when not using the image conversion block 3, for the recording data from the host the addresses for storing information in the register are incremented one at a time in the conventional manner as shown in FIG. 6A, and correspond to counting up the write pointer (WP) in the manner 1→2→3→4→5→ . . . .

However, when using the image conversion block 3 and performing, for example, HV conversion or the like, for the recording data after HV conversion it is not possible to increment addresses for storing information in the register one at a time as shown in FIG. 6A and count up the write pointer (WP) in the manner 1→2→3→4→5→ . . . .

Therefore, by providing a degree of freedom regarding the increment amount of addresses, it is possible to correspond with various data transfer methods from the host, and also to correspond with data conversion at the image conversion block 3.

Figure 11A:
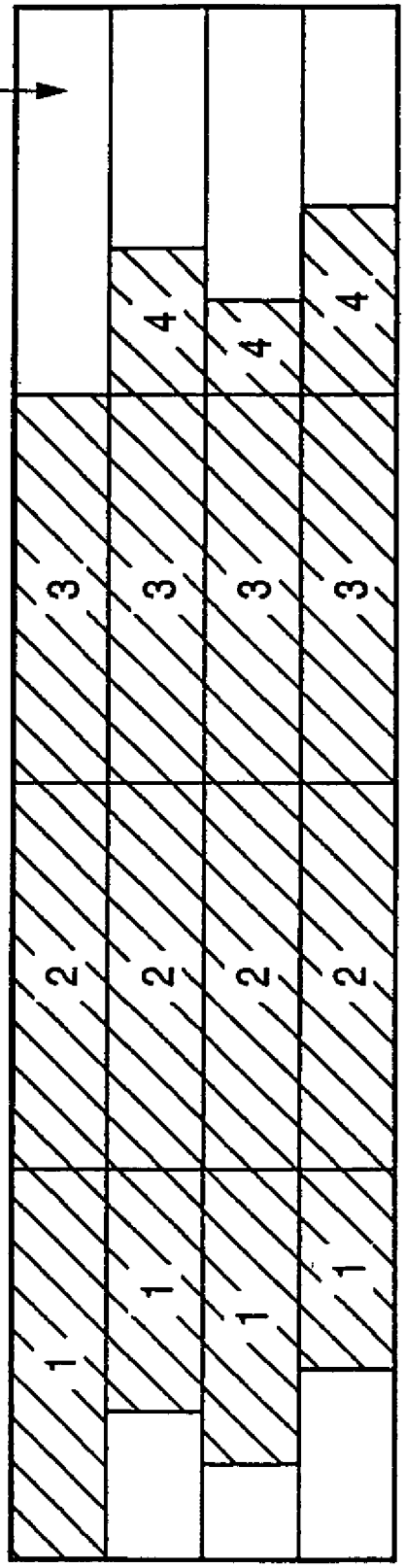
FIG. 11A is a view that schematically illustrates a data state associated with registration adjustment.
Figure 11B:
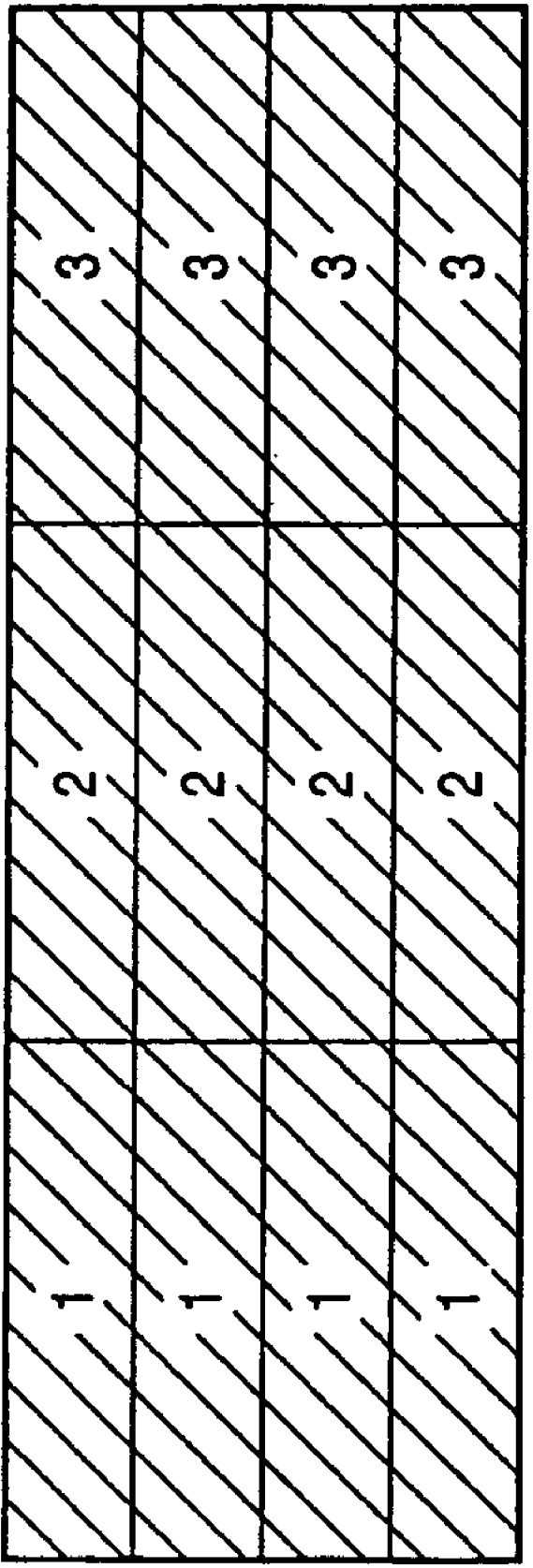
FIG. 11B is a view that schematically illustrates a data state associated with registration adjustment.
Figure 11C:
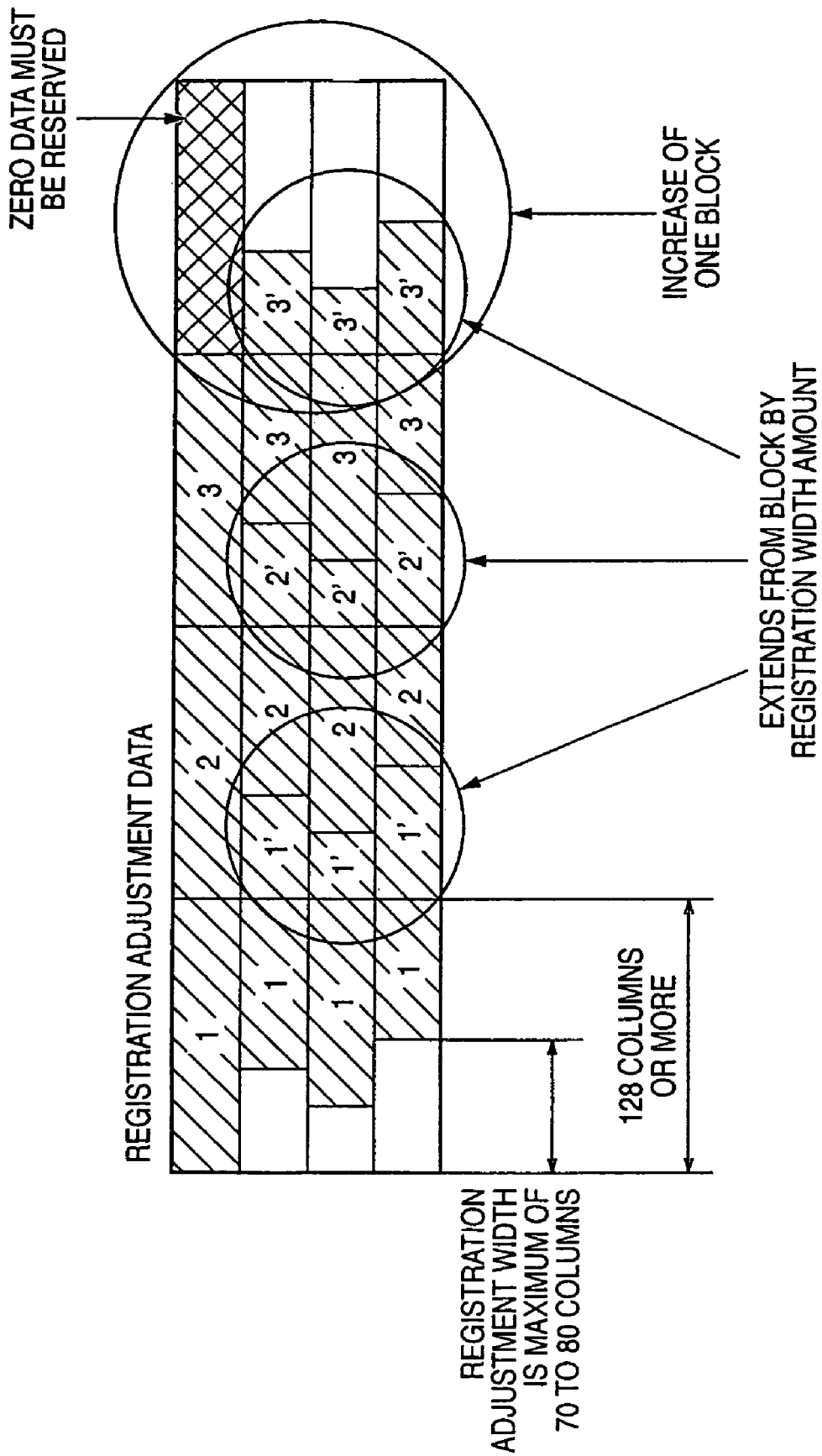
FIG. 11C is a view that schematically illustrates a data state associated with registration adjustment.

FIG. 11A, FIG. 11B and FIG. 11C are views that schematically illustrate data states associated with registration adjustment. The numerical characters in the figures each denote a block number. FIG. 11A illustrates transfer data in a case, as in the conventional example, in which all of the registration adjustment (registration adjustment+Inclination correction) was performed at a host computer (printer driver). FIG. 11B illustrates data that was sent from a host computer and received by the recording apparatus according to this embodiment. Registration adjustment (registration adjustment+inclination correction) has not been performed for this data. FIG. 11C shows the state of data obtained by subjecting data as shown in FIG. 11B to registration adjustment (registration adjustment+inclination correction) on the recording apparatus side and storing the data in the recording buffer 4 provided in the recording apparatus (inkjet recording apparatus).

When recording the data shown in FIG. 11A and the data shown in FIG. 11C on recording mediums, similar recording results will be achieved since both of these data underwent registration adjustment (registration adjustment+inclination correction). However, since the data of FIG. 11C was obtained by subjecting the reception data shown in FIG. 11B to registration adjustment (registration adjustment+inclination correction) at the recording apparatus side, the positions for storing recording data in the raster direction (left to right direction in FIG. 11C) are displaced by the registration adjustment data (registration adjustment value+inclination correction value), and as a result the number of blocks in FIG. 11C is increased by one compared to the data of FIG. 11B.

When the number of blocks sent from the host computer is different to the number of blocks written in the recording buffer of a recording apparatus in this manner, a logic conflict arises. This is because information for a recording width (scanning direction) is output to the recording apparatus from the host computer based on the number of blocks sent from the host computer. Since the recording apparatus performs a recording operation based on this information, recording cannot be performed for only the differing amount with respect to the number of blocks. For example, when recording data for three blocks is output from the host computer to the recording apparatus, and the recording apparatus performs registration adjustment to store the recording data in four blocks, recording is performed only for three blocks and one block is not recorded.

In order to prevent the occurrence of this kind of inconsistency, according to this embodiment when data is transferred from the host computer as shown in FIG. 11B, an extra one block data is added and sent to the recording apparatus to make the number of blocks at the host computer equal to the number of blocks at the recording apparatus (recording buffer).

Figure 12A:
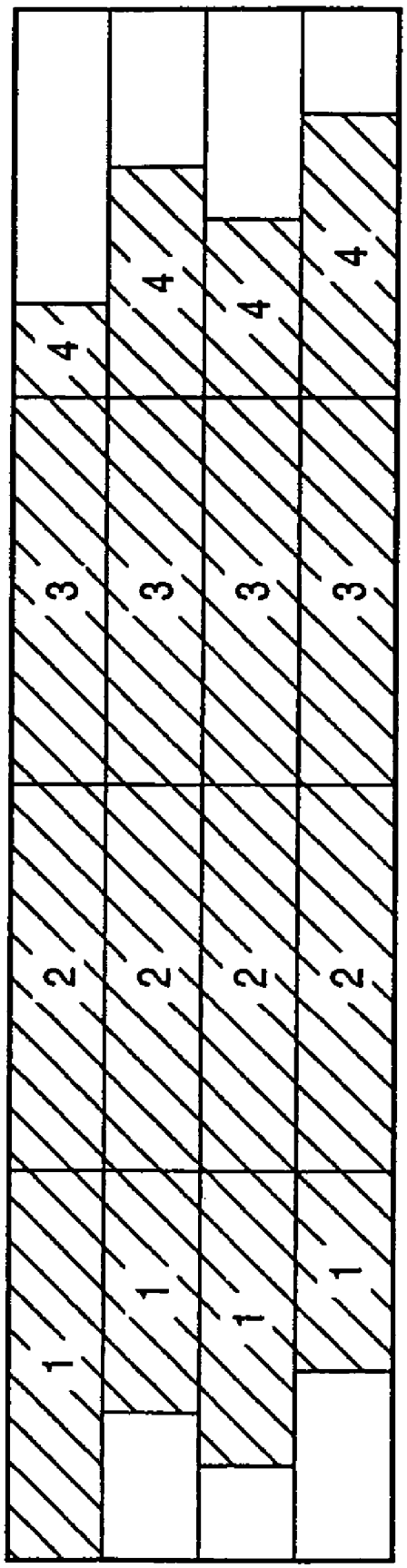
FIG. 12A is a view that schematically illustrates a data state associated with registration adjustment.
Figure 12B:
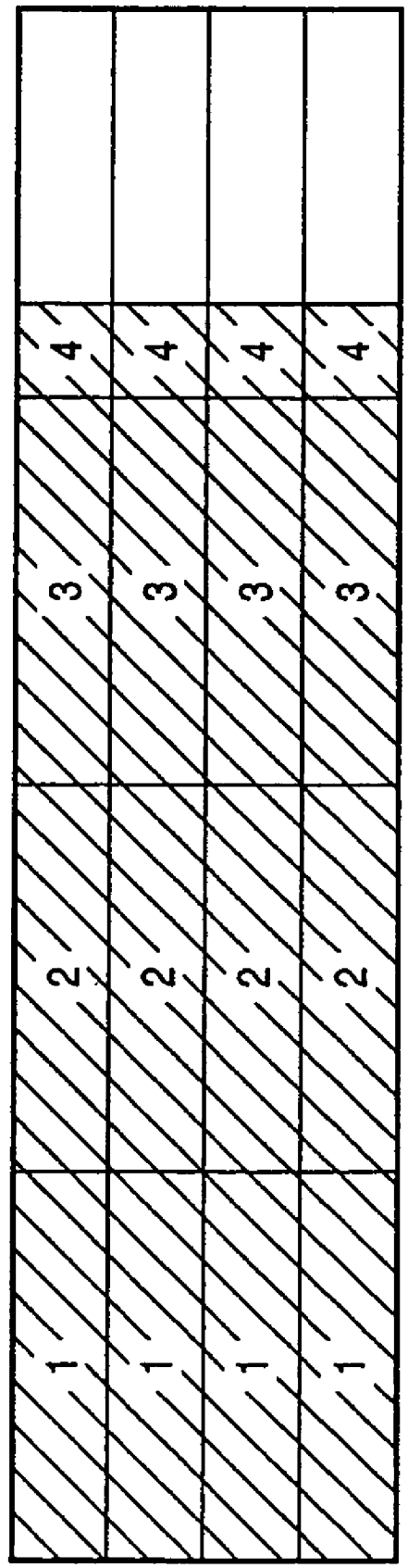
FIG. 12B is a view that schematically illustrates a data state associated with registration adjustment.

FIG. 12A, FIG. 12B and FIG. 12C are views that illustrate data states associated with registration adjustment (registration adjustment+inclination correction) in this embodiment in a similar manner to FIG. 11A to FIG. 11C. FIG. 12A illustrates transfer data in a case, as in the conventional example, in which all of the registration adjustment (registration adjustment+inclination correction) was performed at a host computer (printer driver), and it has the same configuration as FIG. 11A. FIG. 12B illustrates data that was sent from a host computer and received by the recording apparatus according to this embodiment. However, registration adjustment (registration adjustment+inclination correction) has not been performed for this data. FIG. 12C illustrates the state of data obtained by subjecting data as shown in FIG. 12B to registration adjustment (registration adjustment+inclination correction) at the recording apparatus side and storing the data in a recording buffer.

Comparing the data shown in FIG. 11B and FIG. 11C with the data shown in FIG. 12B and FIG. 12C, it is found that although the number of blocks of the data of FIG. 11C obtained by subjecting the reception data of FIG. 11B to registration adjustment (registration adjustment+inclination correction) increased by one as a result of the adjustment, the number of blocks of the data of FIG. 12C obtained by subjecting the reception data of FIG. 12B to registration adjustment (registration adjustment+inclination correction) did not increase. More specifically, when transferring data as shown in FIG. 12B from a host computer, it is not necessary to send an extra one block.

Hereunder, a case of sending an extra one block will be described in more detail in relation to FIG. 11B and FIG. 11C. FIGS. 13A to 13D are views showing the data configuration when transferring an extra one block. In this case, attention should be paid to the relation between the size of one block (block size in scanning direction), the data amount for the end block of recording data that is transferred (data size in scanning direction for third block in FIG. 11C, and data size in scanning direction for fourth block in FIG. 12C), and the registration adjustment amount (for example, value of column unit).

For example, if the block size in the scanning direction<the data size in the scanning direction+the registration adjustment amount (registration adjustment value+inclination correction value), it is necessary to increase the number of blocks by one, as shown in FIG. 11C.

In contrast, if the block size in the scanning direction>the data size in the scanning direction+the registration adjustment amount (registration adjustment value+inclination correction value), it is not necessary to increase the number of blocks, as shown in FIG. 12C.

Thus, the host computer judges whether or not the sum of the data size in the scanning direction and the registration adjustment amount (registration adjustment value+inclination correction value) is greater than the block size in the scanning direction and, depending on the judgment result, performs processing to increase the number of blocks.

Figure 14:
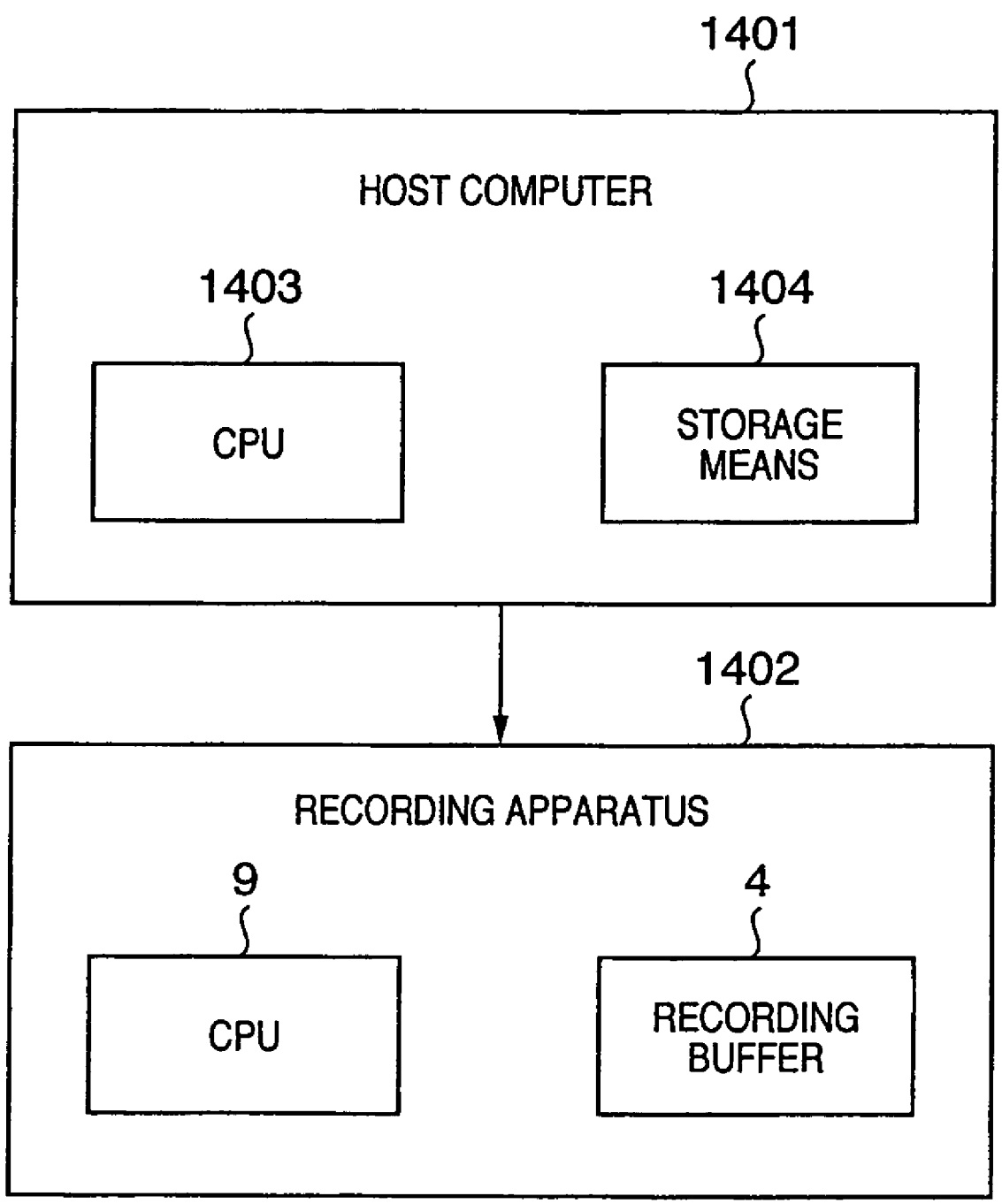
FIG. 14 is a view showing an outline control configuration of a recording apparatus and a host computer according to this invention.

FIG. 14 is a view showing the configuration of a host computer 1401 and a recording apparatus 1402 according to this example.

Recording data is transferred from the host computer 1401 to the recording apparatus 1402 through an interface 1405.

An example of processing performed in the host computer 1401 is described hereafter. A printer driver that generates recording data is implemented by a CPU 1403. This recording data is compressed by a predetermined compression method, and processing is then performed to output the data to the recording apparatus 1402.

Storage means 1404 is used to temporarily store generated recording data or compressed data. Storage means 1404 also comprises a counter that retains a count of the number of blocks (data amount) of the recording data that was generated.

As mentioned above, the CPU 1403 judges whether or not the sum of the data size in the scanning direction and the registration adjustment amount (registration adjustment value+inclination correction value) is greater than the block size in the scanning direction and, depending on the judgment result, performs processing to increase the number of blocks. For this reason, the CPU 1403 previously acquires information regarding the block size in the scanning direction and the registration adjustment amount from the recording apparatus.

Figure 15:
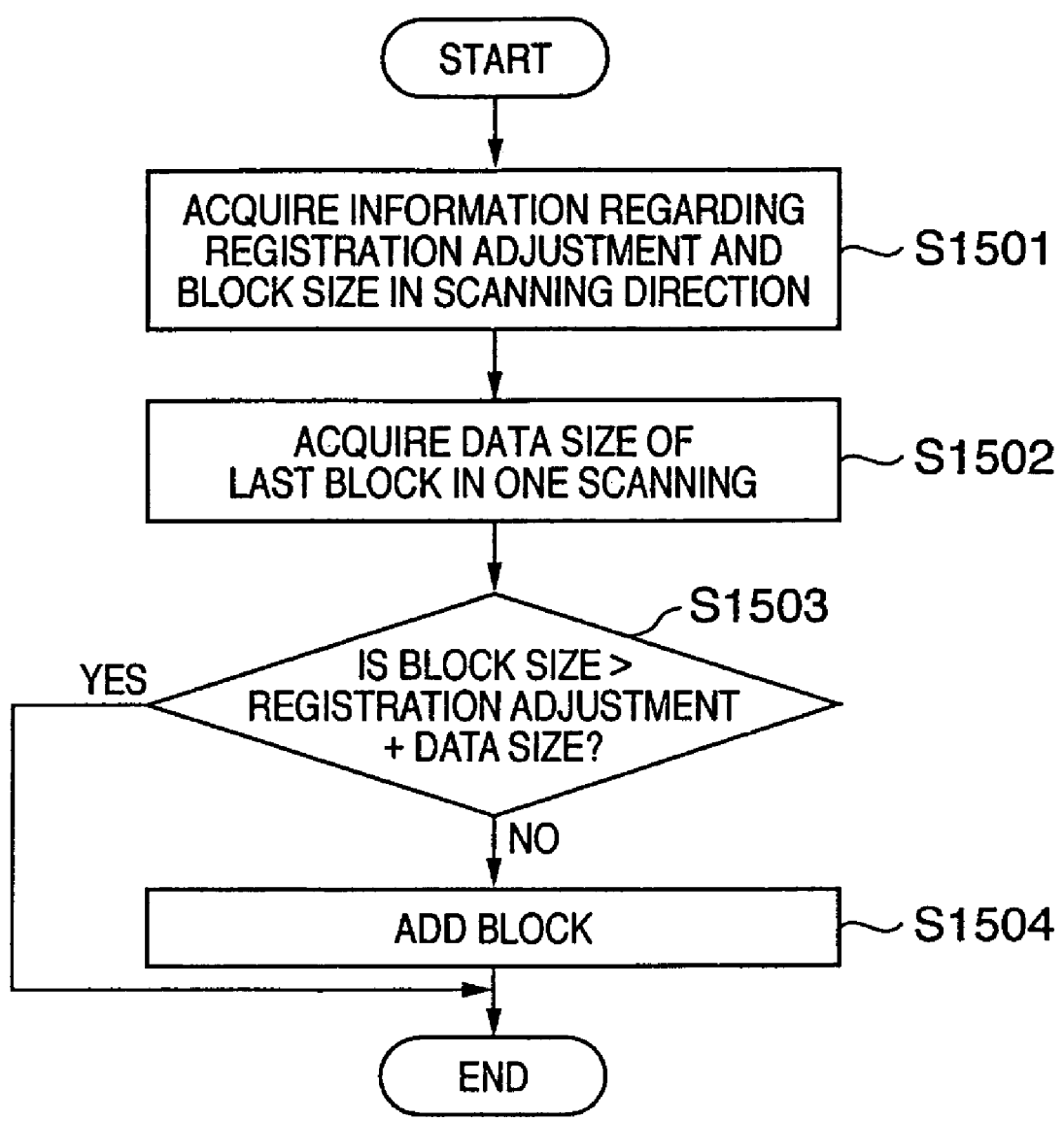
FIG. 15 is a flowchart that illustrates block adding processing.
Figure 16:
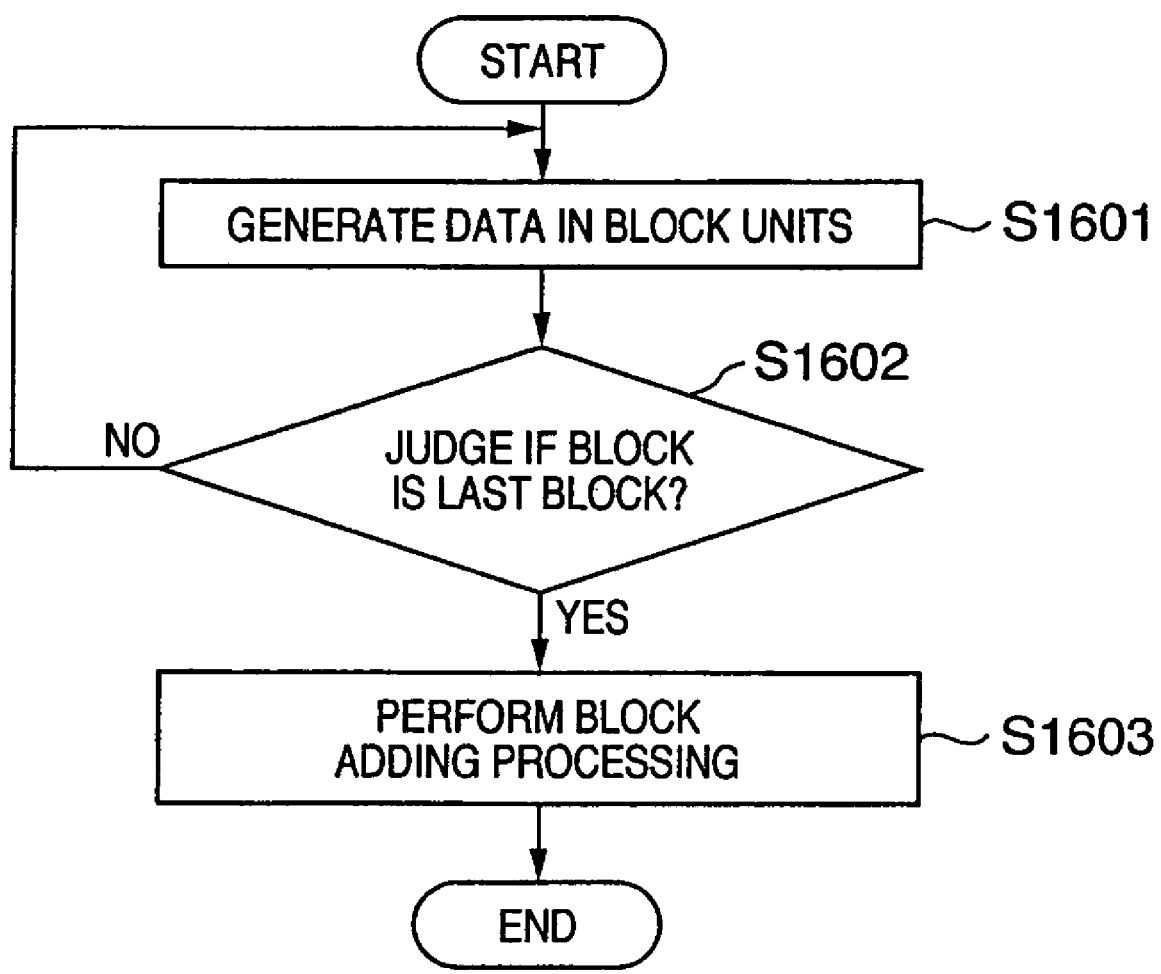
FIG. 16 is a flowchart that illustrates a data generation process.

FIG. 16 is a flowchart illustrating a process for data generation. In step S1601, data is generated in block units. Each time data is generated in block units, the number of blocks generated is counted. In step S1602, the CPU judges whether or not the block in question is the end block (the most downstream block in the scanning direction of the recording head). If the block is the end block, in step S1603 the CPU performs block adding processing. This block adding processing is illustrated in FIG. 15. Since the data amount in the scanning direction differs for each scan, the processing described in FIG. 16 is performed for each scan.

By previously acquiring information regarding the recording width of one scanning, the CPU can acquire the number of generated blocks to be recorded, and this number is used as a threshold value for the judgment of step S1602.

This processing will be described in detail using the flowchart of FIG. 15. In step S1501, the CPU acquires registration adjustment amount information and information regarding the block size (main scanning direction). In step S1502, the CPU acquires the data size (data size in scanning direction) to be stored in the end block. In step S1503, the CPU compares, with respect to the end block, the sum of the data size (scanning direction) and registration adjustment amount (registration adjustment value+inclination correction value) with the block size in the scanning direction. In this example, the data size, registration adjustment amount (registration adjustment value+inclination correction value) and block size are, for example, the number of columns.

In step S1503, if the block size in the scanning direction is smaller (NO), one block is added in step S1504. If the block size in the scanning direction is larger (YES), the processing ends.

This judgment is performed for recording data corresponding to each color. The reason for this is that, although the block size in the scanning direction is the same for each color, the registration adjustment amount and data size in the scanning direction for the end block may differ for each color. If it is necessary to add a block for even one color, a block will also be added for the other colors.

Next, color change codes that are added to the data of each block will be described. As described above in relation to FIG. 3A, a color change code is inserted into each block in order to identify a separation in the recording data.

As shown in FIG. 3B, the data as information for one color consists of compression TAGs and compressed data. A color change code is added after these data.

However, when adding a block in step S1504, only the color change code (232, 233, 239) is added following the end block (the nth block data) 231, and not a compression TAG or compressed data. In this example, since the number of colors is eight, eight color change codes are added. FIG. 3C is a view showing the state from the nth block data onwards in a case in which the code was received.

Since only the color change codes are added, the recording apparatus can recognize (judge) an instruction to perform a process of adding a block and storing recording data because recording data cannot be contained in the block due to registration adjustment. The recording apparatus therefore stores the recording data in the recording buffer on the basis of the registration adjustment amount.

As another example of adding a block, as shown in FIG. 3D, for example, a configuration may be employed in which only one byte of null data (242, 244, ..., 255) is included for each color, and a color change code (243, 245, ..., 256) is added to this null data. Thus, since the data only contains one byte of null data without including a compression TAG, the recording apparatus can easily recognize that this indicates the addition of a block.

Alternatively, as shown in FIG. 3E, a command 262 may be added that indicates an instruction for addition of a block after the final block data (nth block) 261, without adding a color change code.

Figures 13A, 13B, 13C, 13D:
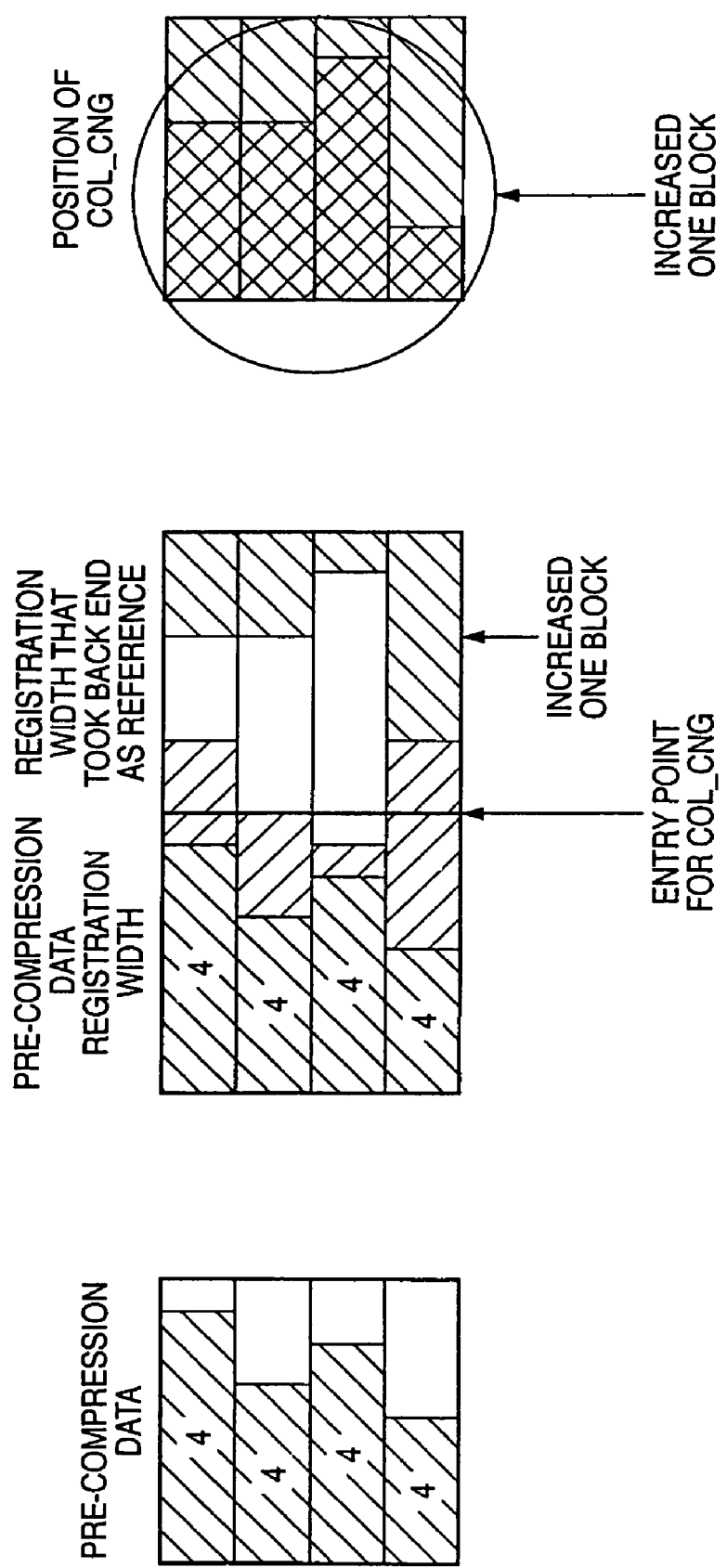

Next, a supplementary explanation will be given regarding storage processing for recording data at the host computer when adding a block as described above. In FIG. 13A shows data before compression, 13B shows a state in which a registration adjustment width was added to data before compression, 13C shows a registration adjustment width that took as a reference the back end of an increased block, and 13D shows the positions in which the last recording data should be stored. In this example, the block in FIG. 13B is the nth block, and the block in 13C is the (n+1)th block.

In this case, it is necessary for the position of the last recording data to be in the area shown by cross hatching in 13D. In the description made using FIG. 13D, the last recording data is in this cross-hatched area. The reason is that, if the last recording data is stored in a diagonally shaded area of FIG. 13D, the blocks will increase by a further one block as a result of registration adjustment.

Similarly to FIGS. 13A to 13D, in FIG. 13E shows data before compression, FIG. 13F shows a state in which a registration adjustment width was added to data before compression, FIG. 13G shows a registration adjustment width that took as a reference the back end of an increased block, and FIG. 13H shows the positions at which color change codes should be inserted. The difference with FIGS. 13A to 13D that an extra one block is not transferred.

In this case also, if the last recording data enters an area other than a cross-hatched area of FIG. 13H, the blocks will increase by a further one block as a result of registration adjustment. Therefore, as shown in FIG. 13H, it is necessary for the position of a color change code to be before the boundary of a registration adjustment width that takes as a reference the back end shown in FIG. 13G.

<Reading Data from Recording Buffer>

Hereunder, processing to read data from a recording buffer will be described referring to FIG. 8. In FIG. 8, the left side shows the read address control section 8A of the record buffering structure control circuit 8, and the right side shows the recording buffer 4.

In the buffer area of the recording buffer 4, the top address of the recording buffer is represented by top_adr and the bottom address is represented by bottom_adr. The top address is stored in the register 803 and the bottom address is stored in the register 804. Similarly to FIG. 5, the reference characters "RP" shown at the recording buffer denote a read pointer and the reference characters "WP" denote a write pointer. A hatching part between reference characters RP and WP in the recording buffer 4 indicates that recording data is stored therein and that recording data is not stored in other parts.

Reference numeral 802 within the read address control section 8A denotes a register that shows a read address (RP: read pointer) of data. Reference numeral 900 that indicates a border surrounded by a broken line denotes a first register group, and reference numeral 901 that indicates a border surrounded by a solid line denotes a second register group.

When recording the recording data of the first block to eighth block, for example, at the start of scanning, information for the first block is stored in the first register group. In the second register group, information for the second block is stored. When recording of the first block ends, the information of the second register group 901 is copied and stored in the first register group 900. Information for the third block is then stored in the second register group 901. Thereafter, the same processing is performed in sequence until the data of the final eighth block is stored. At the start of the next scanning, information for the first block is again stored in the first register group and information for the second block is stored in the second register group.

When information of the (n+1)th block is not stored in the second register group when recording of the nth block shown by the first register group ends, it indicates that the recording data of the (n+1)th block has not yet been prepared. Accordingly, information of the second register group is not copied to the first register group and reading of data from the recording buffer stops.

The register 819 that is inside the first register group is a register for setting height information for the first color (1st_height) and information indicating the existence or non-existence of color data (1_color_bit). The registers 822, 824, 826, 828, 830, 832, and 834 are registers that respectively set height information and information indicating the existence or non-existence of data in a similar manner for the second to eighth colors.

Reference numeral 820 denotes a register that stores width information (block_width) for each block data. This width information is a value that is commonly used for each block from the first to eighth colors.

A register 818 is a register that stores a read address of the first color (1st_color_address). When data of the first color is read from the recording buffer 819 in which it is stored, the address is updated. For example, as shown in FIG. 9, data for one column is read from the data of the first color in the manner 1→2→3→4. Registers 821, 823, 825, 827, 829, 831, and 833 are registers that store read addresses of the second color to eighth color, respectively. The data of the second color to eighth color is also read sequentially by reading the data for one column in the same manner as the data of the first color.

Because the data stored in the recording buffer 4 includes data for a plurality of colors, for example, in a case where the data of the first color, second color . . . was mixed, the addresses for storing data of each color unit are not consecutive. Therefore, if there is one register of read addresses, for example, when reading the address in recording buffer 4 of the first color and then the address in recording buffer 1 of the second color, it is necessary to perform an address calculation. However, by providing a register that stores the read addresses for each color in the recording buffer 4, it is possible to omit the address calculation when performing reading in column units.

Reference numeral 817 denotes an address control register. When the record data generating block 5 requests read addresses for each color through the data read request signal line S805, the address control register 817 adds one address at a time as a read address and outputs the address to the recording buffer 4 through the signal line S806.

Reference numeral 835 denotes a register that stores an address of the next block. If the block that is being currently read is the first block, the top address of the second block is stored in this register. When reading of the block data that is currently being read ends, the value of this register is copied to the register 802. Thus, reading of the next block data can be performed smoothly.

A register 836 is a table that stores information for specifying the reading order with respect to the first to eighth colors. The sequence of reading data from the recording buffer can be freely set using the value set in this table. For example, data can be read in the order of first color→second color→ . . . →eighth color. Alternatively, by changing the value, reading of the data of the third color and fourth color can be skipped so as to read data in the order of first color→second color→fifth color→sixth color→seventh color→eighth color. Thus, it is possible to accurately skip reading of recording data for a color that is not stored.

The second register group 901 is a group of buffers that store information relating to the next block data. When each register of the first register group has been read, the values set in each register of the second register group are set in the corresponding registers of the first register group. For example, the value set in register 838 is set in register 819. Registers 839 to 845 are registers in which similar information is set for the data of the second color to eighth color in the next block data.

In the register 838 (819), buffer height information for data of the first color and information indicating the existence or non-existence of data of the first color is stored.

Reference numeral 846 (820) denotes a register for setting block width information. This width information is a value that is commonly used for each block from the first to eighth colors.

A register 878 is a register that stores information (same_type) indicating whether or not the size of the block in question is the same as the size of the preceding block that was set. By setting this value to "1" when the block size is the same, the same values can be easily reset in the first register group. In that case, setting of registers 838 to 846 can be omitted. In contrast, when the value of the register 878 is "0", the respective values are set in the registers 838 to 846.

As described in the foregoing, in an inkjet recording apparatus according to a preferred embodiment, by providing on the recording apparatus side a function that performs registration adjustment (registration adjustment value+inclination correction value) in a scanning direction of a recording head, it is possible to accelerate the generation of recording data at the host computer and to shorten the time until the recording apparatus executes recording after a recording operation instructed is sent by the host computer.

Although in the above embodiment the blocks of the respective colors all have the same block width, a different block width may be set for each block. Further, although in the above embodiment the number of nozzles of a nozzle row as a unit for inclination correction was set as 16, an appropriate value may be set for this value in accordance with the recording head to be used.

<Calculation of Registration Adjustment Value>

The registration adjustment value information (1_reg_wnum) between the nozzles and registration adjustment value information (1_s_reg_wnum) for inclination correction of nozzles that were described in this embodiment differ in accordance with individual recording heads (recording cartridges) and the installation thereof. Accordingly, although these values may be set during an inspection step or the like before shipment, it is preferable to adopt a method whereby a value is set that was input by the user after visually identifying or reading with a scanner or the like the amount of deviation in a predetermined test pattern that was recorded after exchanging a recording head (recording cartridge). For example, a settings menu may be provided in a printer driver operating on the host computer, to allow the user to set registration adjustment value information with that menu.

As a further example, a user may use an operating panel provided on the recording apparatus to set the amount of deviation that the user visually identified. The registration adjustment value information entered by this setting is stored in storage means provided in the recording apparatus. The registration adjustment value information stored in the storage means is used by the above described record buffering control circuit 8. A configuration may then be adopted whereby registration adjustment value information is transferred in advance from the recording apparatus to the host computer before transferring recording data from the host computer to the recording apparatus. A configuration may also be adopted that sets a value obtained from a sensor provided on the carriage or the like of the recording apparatus.

Detection or calculation of an adjustment value on the basis of this kind of recorded test pattern can be performed by various methods that are already known. However, a detailed description of such methods has been omitted herein, as they do not constitute a feature of this invention.

Other Embodiments

Although the above embodiment described an example in which this invention was applied to an inkjet recording apparatus that performs recording according to an inkjet printing system, this invention can also be applied to a recording apparatus according to a different system, as long as it is a recording apparatus that performs recording by scanning a recording head in which a plurality of recording elements are aligned, in a direction intersecting with the alignment direction of the recording elements.

The above embodiment can achieve high-density, high-definition recording by, in particular, using a system which, even among inkjet recording systems, comprises means (for example, an electrothermal converter or laser) for generating thermal energy as energy to be utilized for discharging ink, and causes a change in state of an ink as a result of the thermal energy.

In addition, not only a cartridge type recording head, as described in the above embodiment, in which an ink tank is integrally arranged on the recording head itself but also an exchangeable chip type recording head which can be electrically connected to the apparatus main body and can receive ink from the apparatus main body upon installation thereof on the apparatus main body can be applied to the present invention.

Further, in addition to the form of an incorporated device or an additional device as an image output terminal of an information processing device such as a computer, the recording apparatus according to the present invention can be in the form of a copying machine with a reader or a facsimile machine which has transmission/reception functions, or a multifunction device that combines the functions of a copying machine and a facsimile machine.

As many apparently widely different embodiments of the present invention can be made without departing from the spirit and scope thereof, it is to be understood that the invention is not limited to the specific embodiments thereof except as defined in the claims.

This application claims the benefit of Japanese Application No. 2005-064558, filed on Mar. 8, 2005, which is hereby incorporated by reference herein in its entirety.

What is claimed is:

1. A recording apparatus that performs recording by scanning a recording head having a plurality of recording element arrays in which a plurality of recording elements are aligned, in a direction intersecting with the alignment direction, comprising:

a receiving buffer that stores recording data for respective recording element arrays, and setting data including first registration information corresponding to a relative distance in a scanning direction between the respective recording element arrays and second registration information corresponding to an inclination in a direction perpendicular to the scanning direction of each of the recording element arrays, the recording data and the setting data being sent from a connected host device;

a recording buffer that stores recording data of each recording element array in association with a recording position in the scanning direction; and writing control means that performs control to adjust a storage position of recording data of each recording element array based on the first and second registration information, and store the data in the recording buffer, wherein the second registration information is a value obtained by converting the inclination into the number of recording pixels in the scanning direction.

2. The recording apparatus according to claim 1, wherein the second registration information is provided for each of predetermined number of recording elements within each recording element array.

3. The recording apparatus according to claim 1, further comprising:

reading control means that controls, for each recording element array, reading address information for reading recording data that is stored in the recording buffer; and recording control means that performs recording by driving each recording element array in accordance with recording data that is read based on the reading address information.

4. The recording apparatus according to claim 1, wherein the apparatus is configured such that recording is performed by each recording element array in respectively different colors.

5. The recording apparatus according to claim 1, wherein the recording buffer is configured to divide a recording area in the scanning direction into a plurality of blocks, and store recording data in each block; and the writing control means has a register that stores, for each recording element array, information for identifying the existence or non-existence of data contained in the recording data, the raster number of the data, and first registration information and a second registration information of the data.

6. The recording apparatus according to claim 5, wherein the writing control means controls address information for storing in the recording buffer, in accordance with the existence or non-existence of recording data in the recording element arrays for each block.

7. The recording apparatus according to claim 1, wherein ink is discharged from each recording element to perform recording.

8. The recording apparatus according to claim 7, wherein each recording element comprises a thermal energy converter for generating thermal energy to be applied to ink in order to discharge ink by using the thermal energy.

9. A data processing method for a recording apparatus that performs recording by scanning a recording head having a plurality of recording element arrays in which a plurality of recording elements are aligned, in a direction intersecting with the alignment direction, and comprises a receiving buffer that stores setting data and recording data of each recording element array that are sent from a connected host device, and a recording buffer that stores recording data of each recording element array in association with a recording position in the scanning direction, the method comprising:

a writing control step of controlling to adjust storage positions of the recording data of the recording element arrays and store the recording data in the recording buffer on the basis of first registration information corresponding to a relative distance in a scanning direction between respective recording element arrays which is contained in the setting data and second registration information corresponding to an inclination in a direction perpendicular to the scanning direction of each recording element array;

a reading control step of controlling, for each recording element array, reading address information for reading recording data that is stored in the recording buffer; and a recording control step of recording by driving each recording element array in accordance with recording data that is read out based on the reading address information, wherein the second registration information is a value obtained by converting the inclination into the number of recording pixels in the scanning direction.

10. A recording system including a recording apparatus that performs recording by scanning a recording head having a plurality of recording element arrays in which a plurality of recording elements are aligned, in a direction intersecting with the alignment direction, and a host device that is connected to the recording apparatus and sends setting data and recording data to the recording apparatus, wherein:

the host device sends, as the setting data, data including first registration information corresponding to a relative distance in a scanning direction between respective recording element arrays, and second registration information corresponding to an inclination in a direction perpendicular to the scanning direction of each recording element array, the recording apparatus comprises a recording buffer that stores recording data of each recording element array in association with a recording position in the scanning direction, and performs control to adjust a storage position of recording data of each recording element array based on the first and second registration information and store the data in the recording buffer, and the second registration information is a value obtained by converting the inclination into the number of recording pixels in the scanning direction.

11. A host apparatus comprising generating means that generates recording data to be output to a recording apparatus that records on a recording medium by scanning a recording head having a plurality of recording element arrays with respect to the recording medium, in block units that correspond to a plurality of divided areas in a scanning direction within a scanning recording area of the recording head on the recording medium, and output means that outputs an instruction including the recording data, the host apparatus further comprising:

registration information acquiring means that acquires first registration information regarding a deviation of the recording element arrays of the recording head and second registration information corresponding to an inclination in a direction perpendicular to the scanning direction of the recording element arrays;

block count acquiring means that acquires the number of blocks corresponding to recording data that is recorded by a single scanning recording by the recording apparatus based on the generated recording data;

judging means that judges whether or not to modify the number of blocks that is acquired by the block count acquiring means based on the first and second registration information;

modifying means that modifies the instruction contents when the judging means makes a judgment to modify the number of blocks; and instruction modifying means for adding, to the instruction, information representing that the judging means modifies the number of blocks.

12. The host apparatus according to claim 11, wherein the judging means compares a sum of a data size in a scanning direction of data corresponding to the most downstream block in the scanning direction among recording data that is recorded by a single scanning recording and the first and second registration information, with information relating to a size per one block in a scanning direction.

13. The host apparatus according to claim 11, wherein the modifying means increases the number of blocks.

14. The host apparatus according to claim 11, wherein the instruction modifying means adds, subsequently to data corresponding to data corresponding to a most downstream block, at least one of predetermined number of data and a command to modify the number of blocks.

15. A computer-executable program embodied in a computer-readable medium in which procedures of the data processing method for a recording apparatus according to claim 9 are described by a program code.

16. A recording apparatus that records by scanning a recording head having a plurality of recording element arrays in which a plurality of recording elements are aligned in a predetermined direction, in a direction intersecting with the alignment direction, comprising:

a recording buffer having a plurality of areas that are divided into a plurality of areas in the scanning direction for recording data of each recording element array;

input means that inputs, from outside, recording data corresponding to the areas divided into a plurality of areas in the scanning direction;

writing control means that controls to adjust storage positions of recording data of the recording element arrays and store the recording data in the recording buffer on the basis of first registration information corresponding to a relative distance in a scanning direction between the recording element arrays and second registration information corresponding to an inclination in a direction perpendicular to the scanning direction of the recording element arrays; and reading control means that reads out, for each recording element array, recording data that is written in the recording buffer, wherein a capacity of the recording buffer is less than a data amount that the recording head can record with one scan.

\* \* \* \* \*